US012459644B2

(12) United States Patent
Smallhorn

(10) Patent No.: US 12,459,644 B2
(45) Date of Patent: Nov. 4, 2025

(54) SYSTEM FOR TRANSPORTING CARGO IN AN AIRCRAFT PASSENGER CABIN

(71) Applicant: INFLIGHT INVESTMENTS INC., St-Laurent (CA)

(72) Inventor: George R. Smallhorn, St-Laurent (CA)

(73) Assignee: INFLIGHT CANADA INC., St-Laurent (CA)

( * ) Notice: Subject to any disclaimer, the term of this patent is extended or adjusted under 35 U.S.C. 154(b) by 238 days.

(21) Appl. No.: 18/314,614

(22) Filed: May 9, 2023

(65) Prior Publication Data

US 2023/0356841 A1 Nov. 9, 2023

Related U.S. Application Data

(63) Continuation-in-part of application No. 17/366,957, filed on Jul. 2, 2021, now Pat. No. 11,724,808.

(60) Provisional application No. 63/048,011, filed on Jul. 3, 2020.

(51) Int. Cl.
*B64D 9/00* (2006.01)
(52) U.S. Cl.
CPC ..................... *B64D 9/00* (2013.01)
(58) Field of Classification Search
CPC ................. B64D 9/003; B64D 9/00
USPC .................................. 193/35 A, 35
See application file for complete search history.

(56) References Cited

U.S. PATENT DOCUMENTS

| 2,605,064 A | 7/1952 | Davis |
| 2,949,863 A | 8/1960 | Cozzoli |
| 3,796,397 A | 3/1974 | Alberti |
| 4,000,870 A * | 1/1977 | Davies ................ B64C 1/20 410/94 |
| 4,807,735 A | 2/1989 | Huber |

(Continued)

FOREIGN PATENT DOCUMENTS

| DE | 102018108803 | * | 9/2019 |
| DE | 202019103706 U1 | | 11/2019 |

(Continued)

OTHER PUBLICATIONS

A Partial European Search Report issued in the corresponding EP24174936.5, dated Aug. 26, 2024.

(Continued)

*Primary Examiner* — Gene O Crawford
*Assistant Examiner* — Lester Rushin, III
(74) *Attorney, Agent, or Firm* — NORTON ROSE FULBRIGHT CANADA LLP

(57) ABSTRACT

A system and method for transporting a cargo container in a cabin of an aircraft are provided. The system comprises a guide rail spanning a length of a seat track and being releasably coupled to the seat track at one or more locations on a bottom surface of the guide rail. A plurality of rollers are coupled to the guide rail where the rollers positioned to engage a surface of the cargo container. The system also comprises a lateral rail comprising a rail member configured to abut a side surface of the cargo container and prevent lateral movement of the cargo container in the cabin. The rail member is slidably mounted on a base to move the rail member laterally within the cabin. When the cargo container deviates from a path defined by the guide rail, the rail member abuts one of the side surfaces of the cargo container.

20 Claims, 19 Drawing Sheets

(56) References Cited

U.S. PATENT DOCUMENTS

| | | | |
|---|---|---|---|
| 5,085,382 A | 2/1992 | Finkenbeiner | |
| 6,129,026 A | 10/2000 | LeCroy | |
| 6,193,453 B1 | 2/2001 | Kernkamp | |
| 6,425,717 B1 | 7/2002 | Saggio et al. | |
| 6,824,338 B2 | 11/2004 | Looker | |
| 8,286,913 B2 | 10/2012 | Barauke | |
| 9,643,723 B2 | 5/2017 | Himmelmann | |
| 9,738,402 B2 | 8/2017 | Brown | |
| 9,908,610 B2 | 3/2018 | Clos | |
| 10,292,798 B2 | 5/2019 | Lampe | |
| 10,450,066 B2 | 10/2019 | Shivalinga et al. | |
| 11,724,808 B2 * | 8/2023 | Smallhorn | B64D 11/0696 244/118.1 |
| 2005/0008443 A1 | 1/2005 | Eitzenberger | |
| 2016/0101864 A1 * | 4/2016 | Kuppan | B60P 7/0892 410/121 |
| 2021/0206493 A1 | 7/2021 | Clos | |

FOREIGN PATENT DOCUMENTS

| | | | |
|---|---|---|---|
| DE | 102020118478 | * | 1/2022 |
| DE | 102020118478 A1 | | 1/2022 |
| DE | 102020122963 | * | 3/2022 |
| DE | 102020122963 A1 | | 3/2022 |

OTHER PUBLICATIONS

An Extended European Search Report (EESR) issued in the corresponding EP24174936.5, dated Nov. 19, 2024.

* cited by examiner

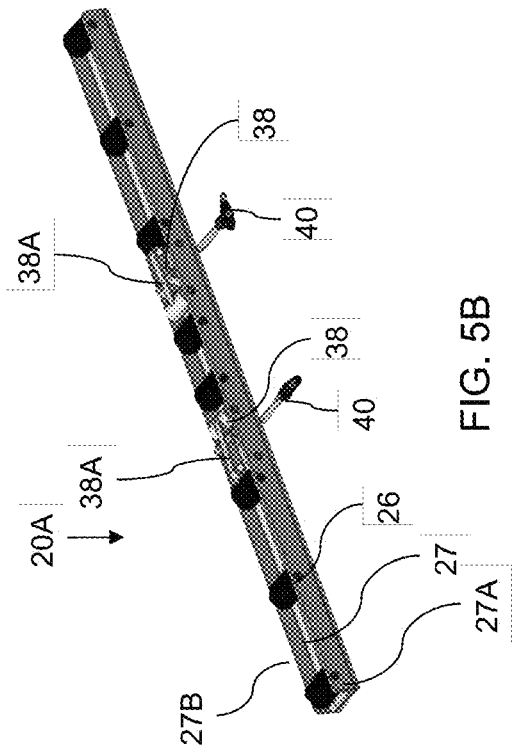
FIG. 5A
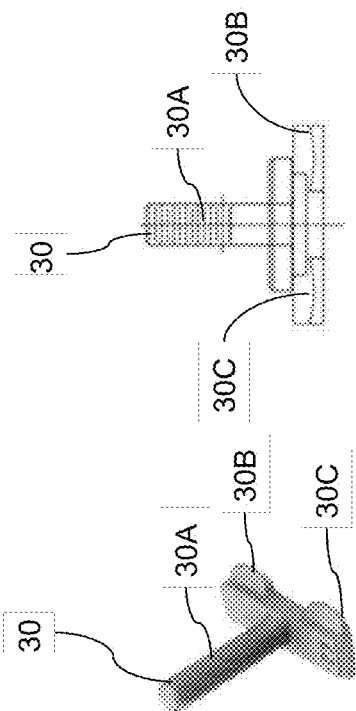
FIG. 5B
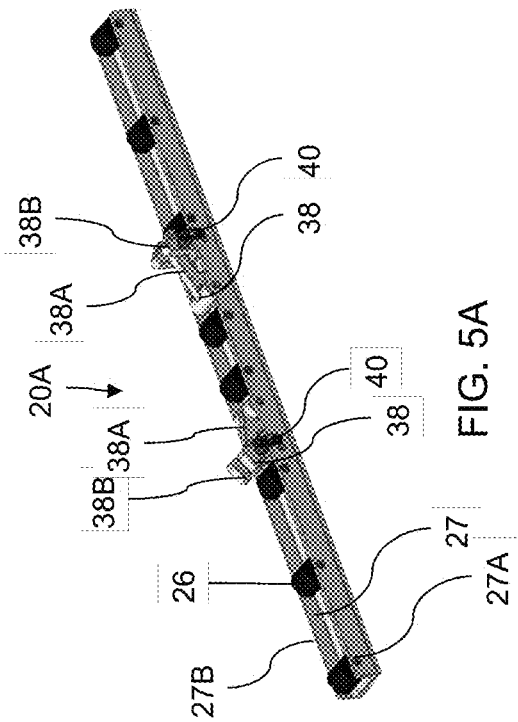
FIG. 5C
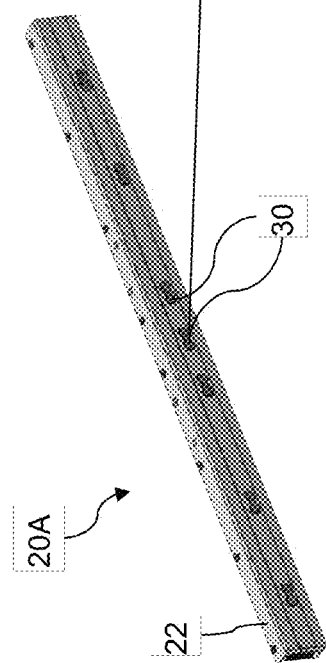
FIG. 5D
FIG. 5E

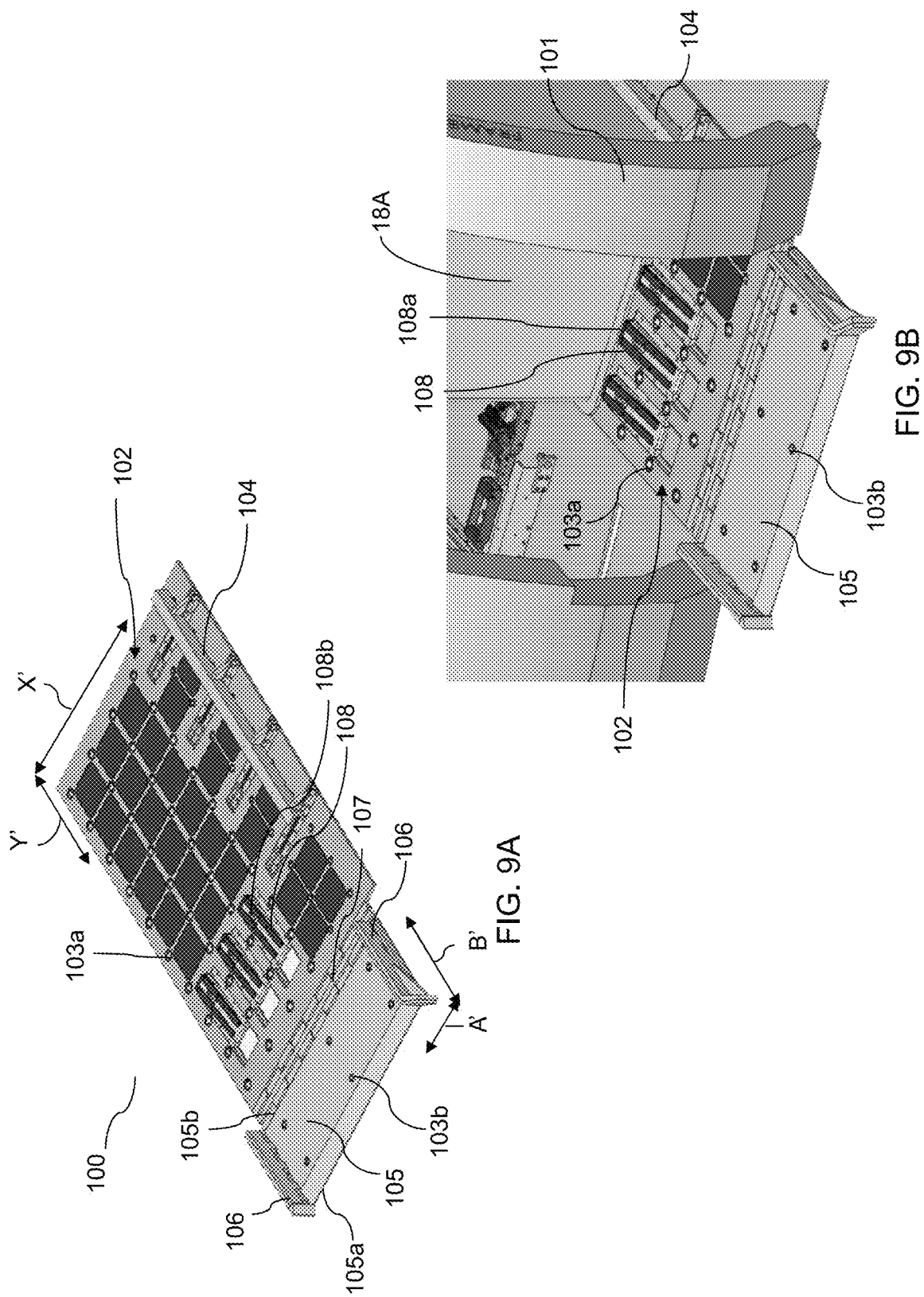

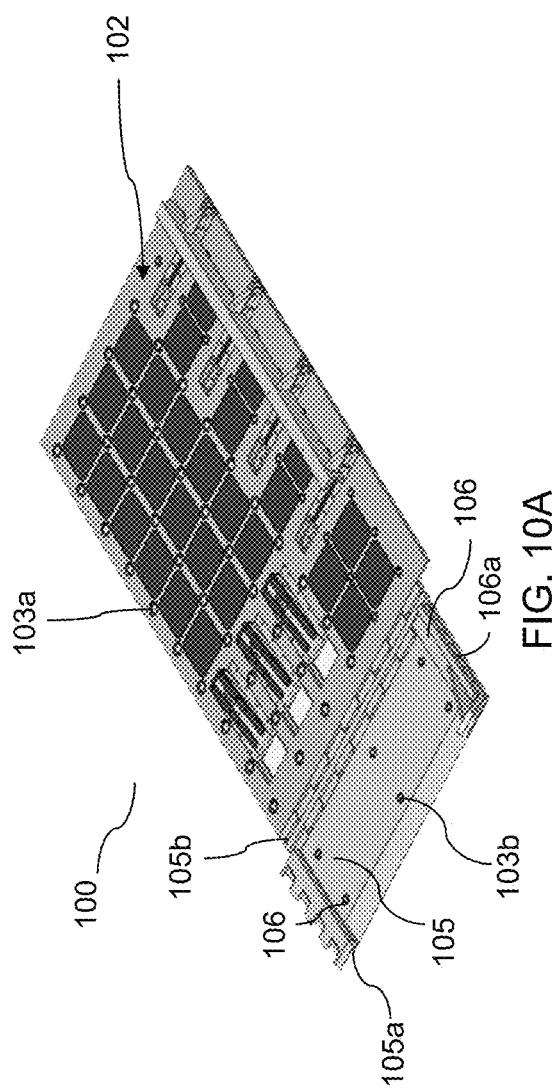
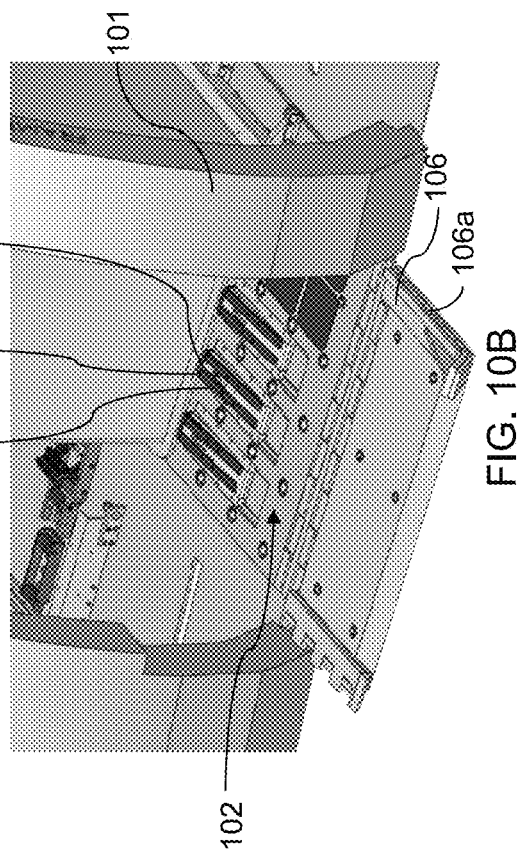
FIG. 10A
FIG. 10B

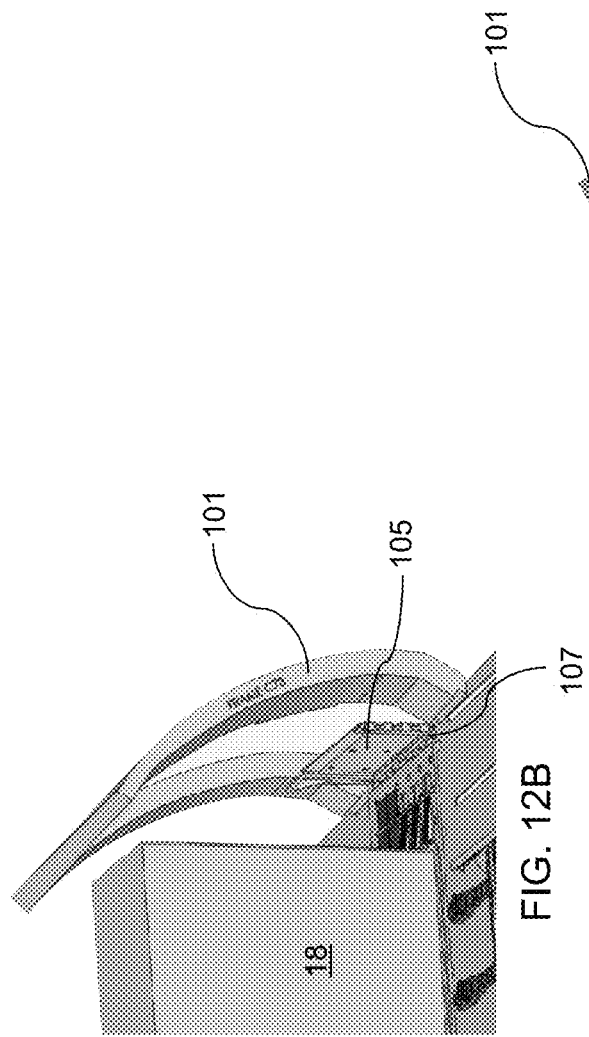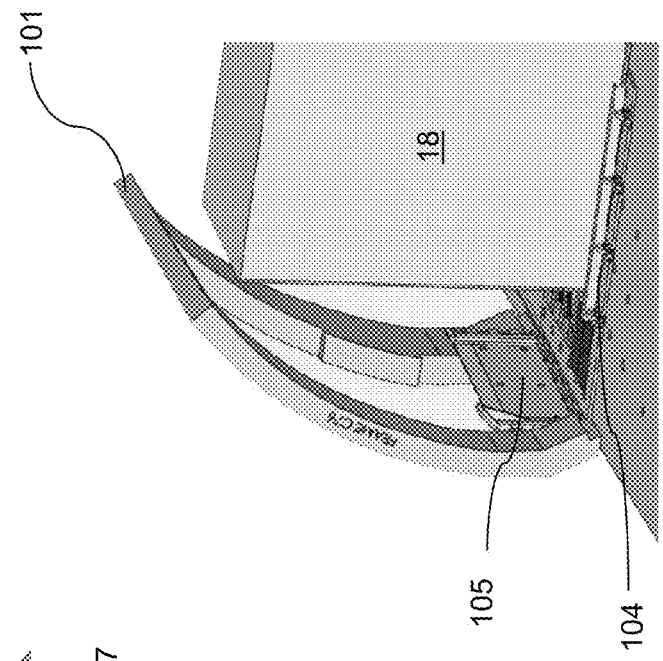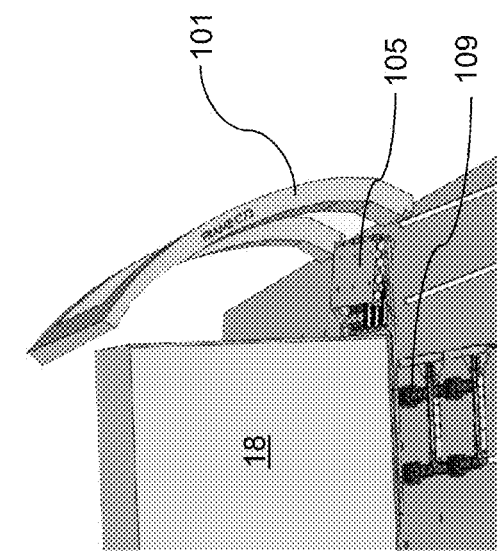
FIG. 12C
FIG. 12B
FIG. 12A

SYSTEM FOR TRANSPORTING CARGO IN AN AIRCRAFT PASSENGER CABIN

CROSS REFERENCE TO RELATED APPLICATION AND CLAIM OF PRIORITY

This is a continuation-in-part application of U.S. patent application Ser. No. 17/366,957, filed on Jul. 2, 2021, which claims priority to U.S. provisional patent application No. 63/048,011 filed on Jul. 3, 2020, the entire contents of which are hereby incorporated herein by reference.

TECHNICAL FIELD

The disclosure relates generally to a system for transporting a cargo container, and more particularly to a system for transporting a cargo container in a passenger cabin of an aircraft.

BACKGROUND

For air cargo transportation, a cargo aircraft and a passenger aircraft are usually used. A cargo aircraft is designed to accommodate cargo on a main deck and a lower deck of the cargo aircraft. A passenger aircraft usually comprises a passenger cabin (i.e. main deck) where passenger seats are installed. A passenger aircraft typically includes a lower deck positioned below a passenger cabin that is used for the storage of cargo (e.g. luggage). With the recent decline in passenger flights, passenger airlines may seek to utilize the passenger cabin of an aircraft for storing cargo. However, passenger cabins are not typically configured to restrain cargo. Therefore, a system for restraining cargo in the passenger cabin is desirable.

SUMMARY

In one aspect, the disclosure describes a system for restraining a cargo container in a cabin of an aircraft, the system comprising: a guide rail spanning a length of a seat track and being releasably coupled to the seat track at one or more locations on a bottom surface of the guide rail; a rail attached to a surface of the cargo container, the rail engaging with the guide rail; and a plurality of rollers coupled to the guide rail, the rollers engaging a surface of the rail; wherein: the rail has at least one side surface that is positioned adjacent to a side surface of at least one of the rollers or the guide rail; and when the cargo container deviates from a path defined by the guide rail, the side surface of the at least one roller or the guide rail abuts one of the side surfaces of the rail.

In some embodiment, a channel is defined along a top surface of the guide rail; the rollers of the guide rail are at least partly fitted within the channel; and a top portion of a rolling surface of each of the rollers is raised relative to the top surface of the guide rail to engage the surface of the rail when the rail engages with the guide rail.

In some embodiments, the system comprises: one or more locking members coupled to the guide rail that are configurable between a retracted position and an extended position and wherein: when a locking member of the one or more locking members is in an extended position, a top portion of an abutting surface of the locking member is elevated relative to each of the rollers to abut an end of the rail and restrict movement of the rail along the guide rail; when a locking member of the one or more locking members is in a retracted position, the top portion of the rolling surface of each roller is elevated relative to the abutting surface of the locking member.

In some embodiments, the one or more locking members are at least partly fitted within the channel; when a locking member of the one or more locking members is in an extended position, the abutting surface of the locking member extends out of the channel and is locked in position using a locking pin; when a locking member of the one or more locking members is in a retracted position, the abutting surface of the locking member is contained within the channel.

In some embodiments, the guide rail is a first guide rail; the seat track is a first seat track; the rail is a first rail; and the plurality of rollers are a plurality of first rollers; and the system comprises: a second guide rail that is parallel to the first guide rail and that is laterally spaced apart from the first guide rail by a distance, the second guide rail spanning a length of a second seat track and being releasably coupled to the second seat track at one or more locations on a bottom surface of the second guide rail; a second rail attached to the surface of the cargo container that is parallel to the first rail and that is laterally spaced apart from the first rail by the distance, the second rail engaging with the second guide rail; and a plurality of second rollers coupled to the second guide rail, the second rollers engaging a surface of the second rail, the second rail having two side surfaces that partially enclose two side surfaces of the second rollers; and wherein when the cargo container deviates from a path defined by the second guide rail, one of the side surfaces of the second rollers abuts one of the side surfaces of the second rail.

In some embodiments, the system comprises a third guide rail that is parallel to and laterally spaced from a fourth guide rail by a distance, the third guide rail spanning a length of a third seat track and being releasably coupled to the third seat track at one or more locations on a bottom surface of the third guide rail, the fourth guide rail spanning a length of a fourth seat track and being releasably coupled to the fourth seat track at one or more locations on a bottom surface of the fourth guide rail; and a wheel track defining a plurality of wheel paths, each wheel path comprising: a first wheel ramp for receiving a wheel of the cargo container, the first wheel ramp configured to engage the wheel and elevate the first rail and second rail to disengage both the first rail from the first guide rail and second rail from the second guide rail when the wheel rolls up a slope of the first wheel ramp; a second wheel ramp positioned parallel to a third or four guide rail, the third and four guide rail spaced laterally from the first and second guide rails, the second wheel ramp configured to lower the first rail onto the third guide rail and the second rail onto the fourth guide rail when the wheel rolls down the slope of the second wheel ramp; and a channel defined by the wheel tracks for restricting movement of the wheel outside of the plurality of wheel paths, the channel positioned at an angle with respect to the first guide rail and second guide rail, the channel communicating with the first wheel ramp and the second wheel ramp.

Embodiments may include combinations of the above features.

In another aspect, the disclosure describes a system for restraining a cargo container in a cabin of an aircraft, the system comprising: a guide rail spanning a length of a seat track and being releasably coupled to the seat track at one or more locations on a bottom surface of the guide rail, the guide rail configured to engage with a rail attached to a surface of the cargo container; and a plurality of rollers coupled to the guide rail, the rollers are configured to engage a surface of the rail when the rail engages with the guide rail; wherein: the rail has at least one side surface that is configured to positioned adjacent to a side surface of at least one of the rollers or the guide rail when the rail engages with the guide rail; and when the cargo container deviates from a path defined by guide rail, the side surface of the at least one roller or the guide rail abuts one of the side surfaces of the rail.

In some embodiments, a channel is defined along a top surface of the guide rail; the rollers of the guide rail are at least partly fitted within the channel; and a top portion of a rolling surface of each of the rollers is raised relative to the top surface of the guide rail to engage the surface of the rail when the rail engages with the guide rail.

In some embodiments, the system comprises: one or more locking members coupled to the guide rail that are configurable between a retracted position and an extended position and wherein: when a locking member of the one or more locking members is in an extended position, a top portion of an abutting surface of the locking member is elevated relative to each of the rollers to abut an end of the rail and restrict movement of the rail along the guide rail; when a locking member of the one or more locking members is in a retracted position, the top portion of the rolling surface of each roller is elevated relative to the abutting surface of the locking member.

In some embodiments, the one or more locking members are at least partly fitted within the channel; when a locking member of the one or more locking members is in an extended position, the abutting surface of the locking member extends out of the channel and is locked in position using a locking pin; when a locking member of the one or more locking members is in a retracted position, the abutting surface of the locking member is contained within the channel.

In some embodiments, the guide rail is a first guide rail; the seat track is a first seat track; the rail is a first rail; and the plurality of rollers are a plurality of first rollers; and the system comprises: a second guide rail that is parallel to the first guide rail and that is laterally spaced apart from the first guide rail by a distance, the second guide rail spanning a length of a second seat track and being releasably coupled to the second seat track at one or more locations on a bottom surface of the second guide rail, the second guide rail being configured to engage with a second rail attached to the surface of the cargo container that is parallel to the first rail and that is laterally spaced apart from the first rail by the distance; and a plurality of second rollers coupled to the second guide rail, the second rollers are configured to engage a surface of the second rail when the second rail engages with the second guide rail, the second rail having two side surfaces that are configured to partially enclose two side surfaces of the second rollers when the second rail engages with the second guide rail; and wherein when the cargo container deviates from a path defined by the second guide rail, one of the side surfaces of the second rollers abuts one of the side surfaces of the rail.

In some embodiments, the system comprises a third guide rail that is parallel to and laterally spaced from a fourth guide rail by a distance, the third guide rail spanning a length of a third seat track and being releasably coupled to the third seat track at one or more locations on a bottom surface of the third guide rail, the fourth guide rail spanning a length of a fourth seat track and being releasably coupled to the fourth seat track at one or more locations on a bottom surface of the fourth guide rail; and a wheel track defining a plurality of wheel paths, each wheel path comprising: a first wheel ramp for receiving a wheel of the cargo container, the first wheel ramp configured to engage the wheel and elevate the first rail and second rail to disengage both the first rail from the first guide rail and second rail from the second guide rail when the wheel rolls up a slope of the first wheel ramp; a second wheel ramp positioned parallel to the third or four guide rail, the third and four guide rail spaced laterally from the first and second guide rails, the second wheel ramp configured to lower the first rail onto the third guide rail and the second rail onto the fourth guide rail when the wheel rolls down the slope of the second wheel ramp; and a channel defined by the wheel tracks for restricting movement of the wheel outside of the plurality of wheel paths, the channel positioned at an angle with respect to the first guide rail and second guide rail, the channel communicating with the first wheel ramp and the second wheel ramp.

Embodiments may include combinations of the above features.

In a further aspect, the disclosure describes a method of retrofitting a cargo container and a seat track in a cabin of an aircraft, the method comprising: fastening a guide rail on the seat track at one or more locations on a bottom surface of the guide rail, the guide rail spanning a length of the seat track, the guide rail having a plurality of rollers coupled thereto; and providing a rail on a surface of the cargo container, the rail being configured to engage with the guide rail, the rail having two side surfaces that are configured to partially enclose two side surfaces of the rollers such that when the cargo container deviates from a path defined by the guide rail, one of the side surfaces of the rollers abuts one of the side surfaces of the rail.

In some embodiments, the method comprises: before fastening the guide rail on the seat track, removing a passenger seat from the seat track.

In some embodiments, the guide rail is a first guide rail; the seat track is a first seat track; the rail is a first rail; and the plurality of rollers are a plurality of first rollers; and the method comprises: fastening a second guide rail on a second seat track at one or more locations on a bottom surface of the second guide rail, the second guide rail is parallel to the first guide rail and is laterally spaced apart from the first guide rail by a distance, the second guide rail spanning a length of the second seat track, the second guide rail having a plurality of second rollers coupled thereto; and providing a second rail on a surface of the cargo container, the second rail being parallel to the first rail and being laterally spaced apart from the first rail by the distance, the second rail being configured to engage with the second guide rail, the second rail having two side surfaces that are configured to partially enclose two side surfaces of the second rollers such that when the cargo container deviates from a path defined by the second guide rail, one of the side surfaces of the second rollers abuts one of the side surfaces of the second rail.

In some embodiments, method comprises: fastening a third guide rail to a third seat track, at one or more locations on a bottom surface of the third guide rail, fastening a fourth guide rail to a fourth seat track, at one or more locations on a bottom surface of the fourth guide rail, wherein the third guide rail is parallel to the fourth guide rail and is laterally spaced apart from the fourth guide rail by a distance, the third guide rail spanning a length of the third seat track, the third guide rail having a plurality of third rollers coupled thereto, and the fourth guide rail having a plurality of fourth rollers coupled thereto, fastening a wheel track to the first, second, third, and fourth seat track, the wheel track comprising: a first wheel ramp for receiving a wheel of the cargo container, the first wheel ramp configured to engage the wheel and elevate the first rail and second rail to disengage both the first rail from the first guide rail and second rail from the second guide rail when the wheel rolls up a slope of the first wheel ramp; a second wheel ramp positioned parallel to the third or four guide rail, the third and four guide rail spaced laterally from the first and second guide rails, the second wheel ramp configured to lower the first rail onto the third guide rail and the second rail onto the fourth guide rail when the wheel rolls down the slope of the second wheel ramp; and a channel defined by the wheel track, the channel defining a wheel path from the first wheel ramp to the second wheel ramp, the channel positioned at an angle with respect to the first guide rail and second guide rail.

In some embodiments, the wheel track comprises a plurality of wheel track portions positioned in a grid, the plurality of wheel track portions defining a plurality of wheel paths positioned to permit simultaneous movement of a plurality of wheel of the cargo container within the channel.

Embodiments may include combinations of the above features.

In a further aspect, the disclosure describes a device for facilitating movement a cargo container through a door frame of an aircraft. The device comprises: a ball transfer deck comprising: a first plurality of load bearing rollers defining a first plane, the first plurality of load bearing rollers configured to receive the cargo container thereon; and a first retaining rail coupled to the ball transfer deck, the first retaining rail configured to restrict movement of the cargo container in the forward or aft direction. The device also comprises a bridge having a length, width, a distal end, and a proximal end. The bridge comprises: a second plurality of load bearing rollers defining a second plane, the second plurality of load bearing rollers configured to receive the cargo container thereon, the bridge configured to extend through the door frame in an extended position to receive the cargo container. The bridge may also configured to retract and be entirely defined within a cabin of the aircraft in a retracted position; and comprises a plurality of second retaining rails configured to extend through the door frame for guiding the cargo container through the door frame. The ball transfer deck and the bridge define a pathway for the cargo container to move between the exterior of the cargo cabin and the interior of the cargo cabin.

In an embodiment, the first plurality of load bearing rollers and/or the second plurality of load bearing rollers are configured for universal rotation.

In an embodiment, the ball transfer deck is coupled to the bridge at a hinge, and the ball transfer deck rotates about the hinge to move between the retracted and the extended positions.

In another embodiment, the plurality of second retaining rails are foldable between a first position perpendicular to the bridge and a second position abutting the bridge.

In another embodiment, the ball transfer deck comprises at least one stopper member having an abutting surface positioned to prevent the cargo container from moving toward the door frame, and the stopper is configured to move between a depressed position in which the cargo container may move over the stopper and an elevated position where the abutting surface prevent the cargo container from moving toward the door frame. The stopper member may have a general shape of a wedge, and the abutting surface may be positioned in a direction away from door frame.

In another embodiment, the first retaining rail is slidably coupled to the ball transfer deck and configured to be moveable toward and away from an opposing edge of the ball transfer deck.

In another embodiment, the device comprising a pallet lock opposing the first retainer rail, the pallet lock positioned to lock the cargo container on top of the ball transfer deck.

Embodiments may include combinations of the above features.

In a further aspect, the disclosure describes a system for transporting a cargo container in a cabin of an aircraft. The system comprises: a guide rail spanning a length of a seat track and being releasably coupled to the seat track at one or more locations on a bottom surface of the guide rail; a plurality of rollers coupled to the guide rail, the rollers positioned to engage a surface of the cargo container; and a lateral rail. The lateral rail comprises: a rail member configured to abut a side surface of the cargo container and prevent lateral movement of the cargo container in the cabin, the rail member slidably mounted on a base to move the rail member laterally within the cabin. When the cargo container deviates from a path defined by the guide rail, the rail member abuts one of the side surfaces of the cargo container.

In an embodiment, the rail member is telescopically mounted to the base.

In another embodiment, the rail member is configured to be positioned parallel to a longitudinal axis of the cabin.

In another embodiment, the rail member comprises a flange for abutting surface of the cargo container and prevent upward movement of the cargo container in the cabin.

In another embodiment, the telescoping member comprises a lock for fixing the position of the rail member.

In another embodiment, the telescoping member comprises a tie bar coupled to the guide rail, and a sliding member coupled to the structural channel and the rail member.

In another embodiment, the system comprises a plurality of locks, e.g. pallet locks, for fixing the cargo container in a static position.

In another embodiment, the ball transfer deck, the bridge, and the guide rail define the pathway. The first plane may be approximately parallel to a top surface of the plurality of rollers.

Embodiments may include combinations of the above features.

In a further aspect, the disclosure describes a method of retrofitting a cargo container. The method comprises: providing the system of described above; fastening the guide rail on one of the at least one seat tracks at one or more locations on a bottom surface of the guide rail, the guide rail spanning a length of the seat track; coupling the base of a first lateral rail to one of the at least one seat tracks; and coupling the base of a second lateral rail to one of the at least one seat tracks, first and second lateral rails defining a pathway for moving the cargo container.

In an embodiment, the method comprises: providing the device for facilitating movement of a cargo container through a door frame of an aircraft described above, fastening the ball transfer deck to a floor of the aircraft cabin adjacent to the door frame, the bridge positioned to extend through the door frame when in the expended position, where the pathway is defined by the ball transfer deck, the bridge, the guide rails and the first and second lateral rails.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 5A is a perspective view of a guide rail of system of FIG. 1 showing a locking member coupled to the guide rail that is configured in an extended positon;

FIG. 5B is a perspective view of a guide rail of system of FIG. 1 showing a locking member coupled to the guide rail that is configured in an retracted positon;

FIG. 5C is a perspective view a guide rail of system of FIG. 1 showing one or more threaded studs coupled to a bottom surface of the guide rail;

FIG. 5D is a perspective view of the threaded stud of FIG. 5C;

FIG. 5E is a front view of the threaded stud of FIG. 5C;

FIG. 9A is a perspective view of an example device for conveying a cargo container through a door frame of an aircraft. The device is shown in an extended position FIG. 9B is a cut-away perspective of the device of FIG. 9A receiving a cargo container and a door frame of an aircraft. The device is shown in an extended position extending through the door frame.

FIG. 10A is a perspective view of the device of FIG. 9A. Retainer rails on a bridge of the device are folded.

FIG. 10B is a perspective view of the device of FIG. 9A extending through a door frame of an aircraft. Retainer rails on a bridge of the device are folded.

FIGS. 12A-12C are perspective view of a door frame and cargo container on the device of FIG. 9A. FIG. 12A illustrates a bridge of the device in a retracted position.

FIGS. 12B and 12C illustrate front and back perspective views of the bridge in an intermediate position.

DETAILED DESCRIPTION

The following description discloses systems and methods for transporting a cargo container in a passenger cabin of an aircraft. A system is disclosed that utilizes an existing seat track installed in the passenger cabin to support a weight of the cargo container. The system may include a guide rail that is coupled to the seat track and a rail attached to a surface of the cargo container. The system may include a plurality of rollers that are coupled to the guide rail that engage with a surface of the rail when the rail engages the guide rail. The rail may have two side surfaces that partially enclose two side surfaces of the rollers. When the cargo container deviates from a path defined by the guide rail, one of the side surfaces of the rollers abuts one of the side surfaces of the rail or guide rail to restrict lateral movement of the cargo container relative to the guide rail.

Although terms such as "maximize", "minimize" and "optimize" may be used in the present disclosure, it should be understood that such term may be used to refer to improvements, tuning and refinements which may not be strictly limited to maximal, minimal or optimal.

The singular forms "a," "an," and "the" include the plural reference unless the context clearly dictates otherwise. The term "and/or" means any one of the items, any combination of the items, or all of the items with which this term is associated.

The term "connected" or "coupled to" may include both direct coupling (in which two elements that are coupled to each other contact each other) and indirect coupling (in which at least one additional element is located between the two elements) unless specified otherwise.

The term "engage" may include direct engagement (in which two elements are in direct contact with one another) or indirect engagement (in which at least one additional element is located between the two elements) unless otherwise specified. Throughout the description reference is made to rails engaging guide rails. In this case, the rails may not be in direct contact with guide rails and may have rollers located between the rails and guide rails that are in contact with both the rails and the guide rails.

The term "substantially" as used herein may be applied to modify any quantitative representation which could permissibly vary without resulting in a change in the basic function to which it is related.

Aspects of various embodiments are described through reference to the drawings.

Figure 1:
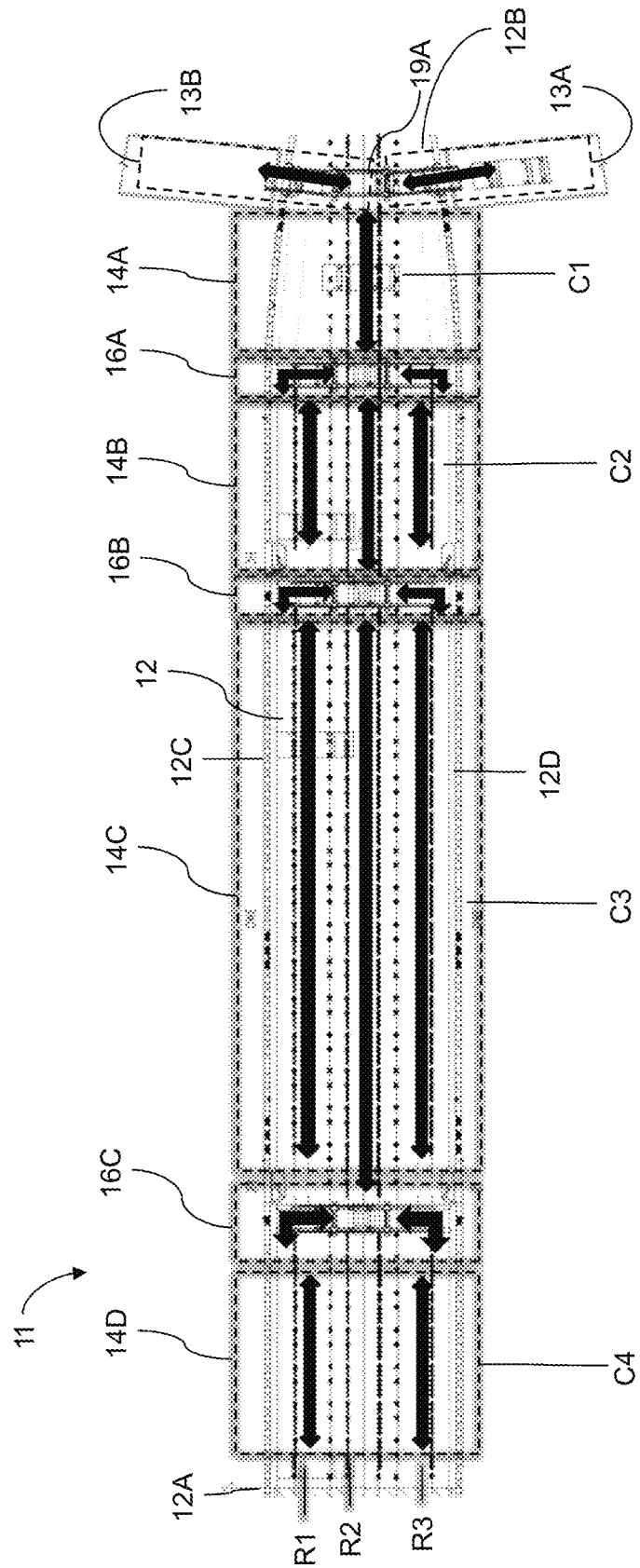
FIG. 1 is a schematic diagram of an exemplary layout of a system for restraining a cargo container in a cabin of an aircraft.

FIG. 1 illustrates a schematic diagram of an exemplary layout of system 11 for restraining one or more cargo containers 18 (hereinafter referred to in singular) in passenger cabin 12 of an aircraft. Cabin 12 may have front and back ends 12A, 12B (also referred to as fore and aft ends)

and left and right ends 12C, 12D (also referred to as port and starboard sides). Cabin 12 may be designed to accommodate a plurality of seating modules along seating tracks arranged in rows R1-R3. Rows R1 and R3 may extend along each window side of cabin 12. Row R2 may extend along a center of cabin 12. Rows R1, R3 may be spaced apart from row R2 such that a respective aisle extends between them. The seating tracks may also be arranged in one or more columns C1-C4. Each column C1-C4 may define a seating section offering a specific class of service. It should be understood that the seating tracks installed in cabin 12 may be arranged differently having a different number of rows and/or a different number of columns.

To allow cargo container 18 to be accommodated and restrained within cabin 12, cabin 12 may be modified to remove some or all of the seating modules from their corresponding seat tracks. Cabin 12 may have some or all of seating modules removed before system 11 is installed in cabin 12. System 11 may use the existing seat tracks installed in cabin 12 to restrain cargo container 18 during flight.

An operator loading cargo container 18 in cabin 12 may use system 11 to transport cargo container 18 from an exterior of an aircraft to any location within cabin 12 where a seating module was previously installed. Using system 11 to load cargo container 18 in an aircraft may ensure that cargo container 18 is not placed directly on floor 36 (shown in FIG. 2) of cabin 12 at any point during loading. System 11 may include rail systems 13A-13B, 14A-14D, 16A-16C. In some embodiments, system 11 may include one or more rails 24A-24D and/or one or more caster wheels 34A-34D installed on bottom surface 18A of cargo container 18 (partially shown in FIG. 3) that engage one or more rail systems 13A-13B, 14A-14D, 16A-16C.

Rail systems 13A, 13B may each be incorporated into a respective ramp that is used for transporting cargo container 18 from an exterior of aircraft into cabin 12. The ramps may be external to an aircraft and rail systems 13A, 13B may each be incorporated into a respective ramp before the ramp is ready for use. Rail system 13A may have an identical design as rail system 13B. Each rail system 13A, 13B may be configured to transport cargo container 18 from an exterior of an aircraft to transition zone 19A within cabin 12. In some embodiments, rail systems 13A, 13B may engage one or more caster wheels 34A-34D installed on a bottom surface of cargo container 18 (shown in FIG. 4). Only one cargo container 18 may be transferred at a given time between transition zone 19A and rail system 14A.

Rail systems 14A-14D may be incorporated into the existing seating tracks of columns C1-C4, respectively. Rail systems 14A-14D may be configured to transport cargo container 18 towards aft end 12B of cabin 12 and may also serve as a support structure for supporting a weight of cargo container 18 during flight. It may be desirable to support cargo container 18 on rail systems 14A-14D rather than a floor of cabin 12 since a floor of cabin 12 may not have the requisite strength to support the weight of cargo container 18. The floor of cabin 12 may be deformed and/or may sustain other types of defects if the weight of cargo containers 18 were directly placed on the floor structure of cabin 12 during flight. Cargo container 18 may be selectively positioned along rail systems 14A-14D and locked in position before flight. In some embodiments, it may be desirable for an operator to store cargo container 18 at a location that is closest to an aft end 12B of cabin 12 in order to maximize the number of cargo container 18 that can be accommodated in cabin 12. In some embodiments, rail systems 14A-14D may engage one or more rails 24A-24D attached to bottom surface 18 of cargo container 18 (shown in FIG. 4).

Each one of rail systems 16A-16C may be disposed between columns C1-C4. Rail systems 16A-16C may be configured to transport cargo container 18 in a lateral direction relative to rail systems 14A-14D to transport a given cargo container 18 from one of rows R1-R3 to another one of rows R1-R3. The lateral movement of cargo container 18 provided by rail systems 16A-16C may allow an operator to be more selective on where a given cargo container should be stowed during flight. In some embodiments, rail systems 16A-16C may engage one or more caster wheels 34A-34D installed on bottom surface 18A of cargo container 18 (shown in FIG. 4).

Figure 2:
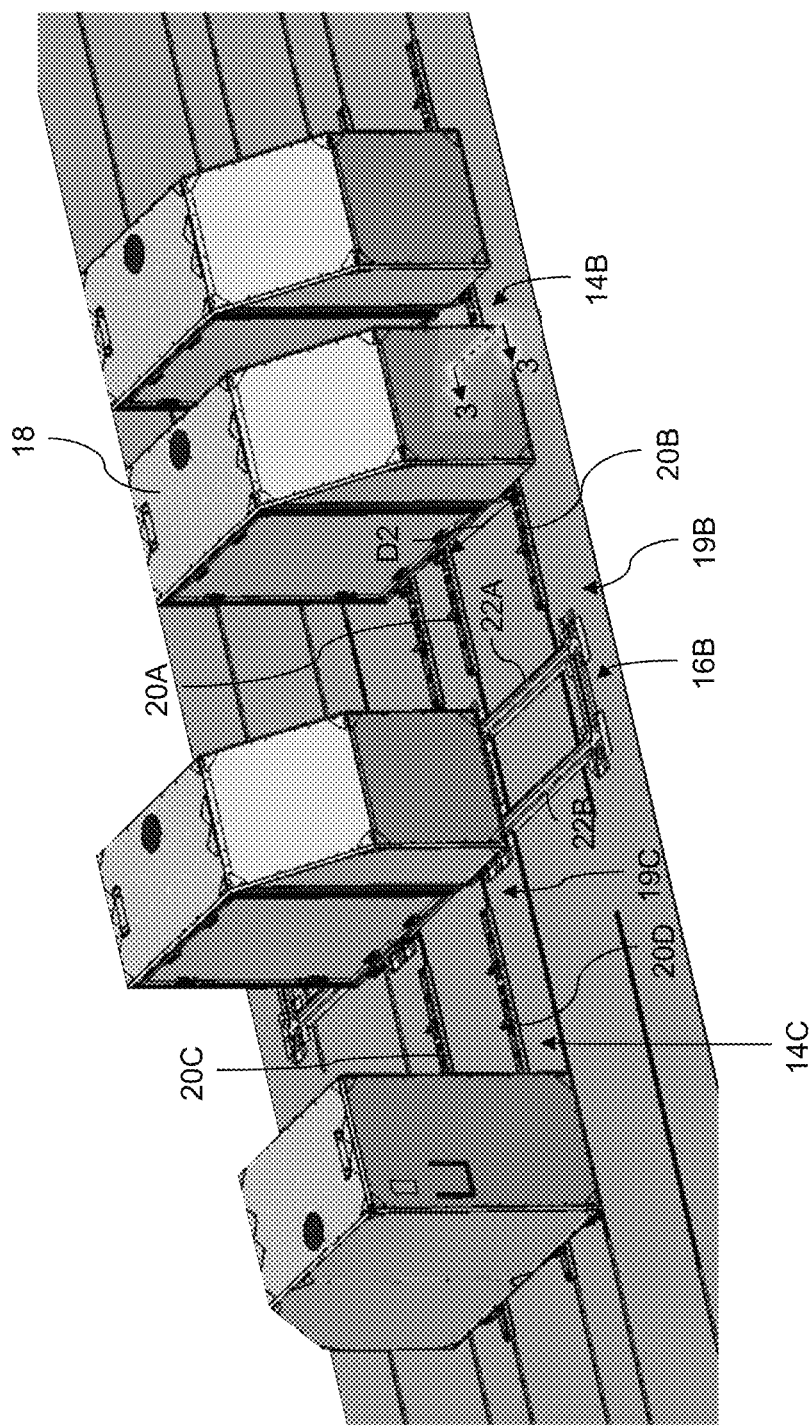
FIG. 2 is a perspective view of a cargo container being transported along a portion of the system of FIG. 1.

FIG. 2 illustrates a perspective view of cargo container 18 being transported along a portion of system 11.

Rail system 14B may include first guide rail 20A and second guide rail 20B. Guide rails 20A, 20B may define a guided path for transporting cargo containers between rail system 16A and rail system 16B (shown in FIG. 1). Guide rails 20A, 20B may engage with first rail 24A and second rail 24B, respectively, that are attached on bottom surface 18A of cargo container 18 (shown in FIG. 4). When rails 24A, 24B engage with guide rails 20A, 20B, respectively, an operator can push cargo container 18 in a direction substantially parallel to guide rails 20A, 20B to move cargo container 18 along guide rails 20A, 20B. A weight of cargo container 18 may be supported by guide rails 20A, 20B when cargo container 18 is being moved along guide rails 20A, 20B. In some embodiments, cargo container 18 may be locked in position on guide rails 20A and 20B for flight using locking member 38 (shown in FIG. 5A).

Rail system 16B may include first wheel track 22A and second wheel track 22B. Wheel tracks 22A, 22B may support a weight of cargo container 18 and may define a guided path for transporting cargo container 18 between rail system 14B and rail system 14C. At transition zone 19B, wheel tracks 22A, 22B may engage respective caster wheels 34A-34B attached on bottom surface 18A of cargo container 18 (shown in FIG. 4) and rails 24A, 24B may be elevated such that rails 24A, 24B disengage guide rails 20A, 20B, respectively. At transition zone 19C, wheel tracks 22A, 22B may disengage caster wheels 34A-34B and rails 24A and 24B may be lowered such that rails 24A and 24B engage guide rails 20C and 20D, respectively.

Rail system 14C may include third guide rail 20C and fourth guide rail 20D. Guide rails 20C, 20D may define a guided path for transporting cargo containers between rail system 16B and rail system 16C. When rails 24A, 24B engage guide rails 20C, 20D, respectively, an operator can push cargo container 18 in a direction substantially parallel to guide rails 20C, 20D to move cargo container 18 along guide rails 20C, 20D. A weight of cargo container 18 may be supported by guide rails 20C, 20D when cargo container 18 is being moved along guide rails 20C, 20D.

Figure 3:
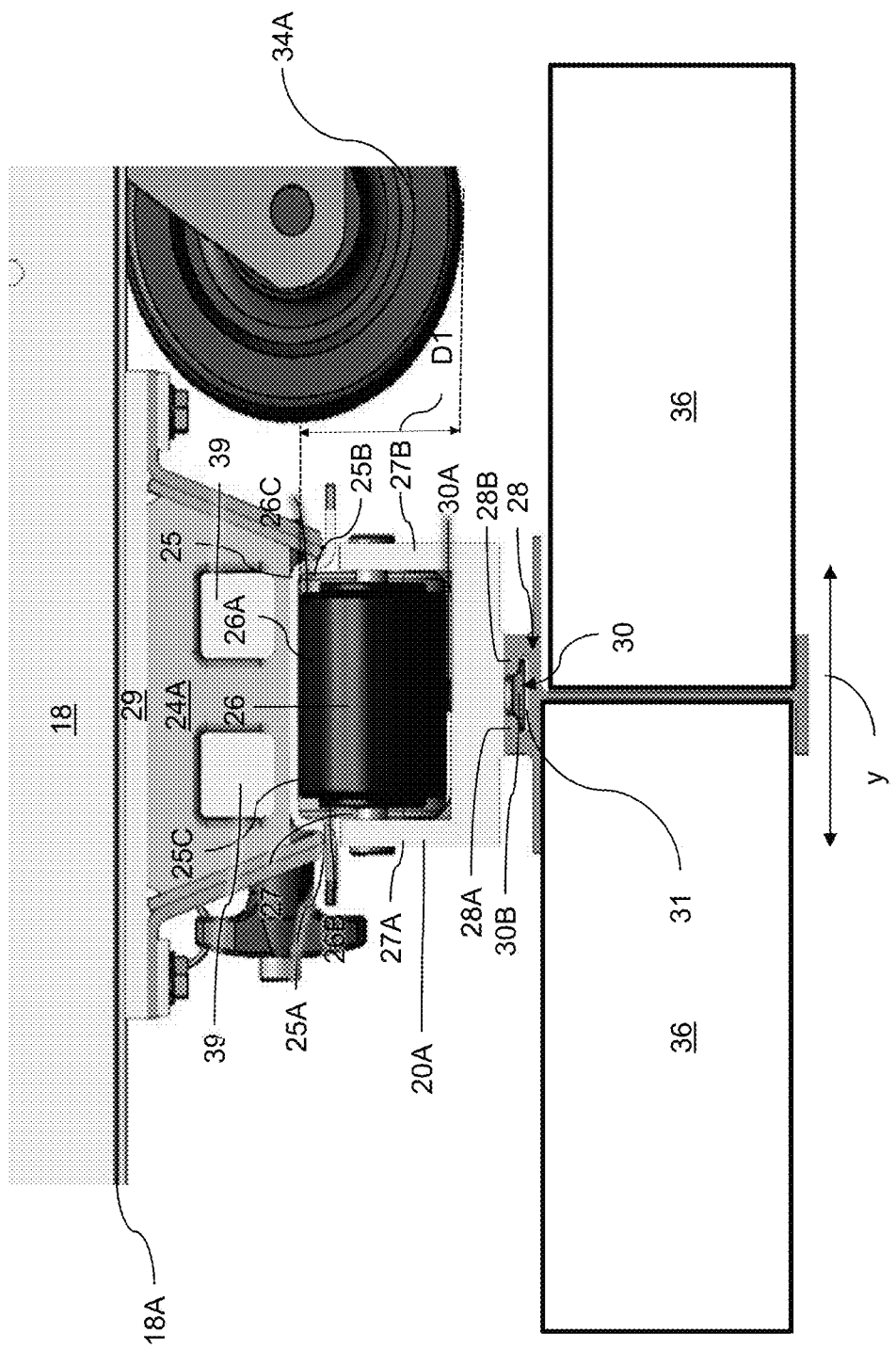
FIG. 3 is a cross-sectional view of a portion of system 11 and a cargo container taken along line 3-3 in FIG. 2.

FIG. 3 illustrates a cross-sectional view of a portion of system 11 taken along line 3-3 in FIG. 2. First guide rail 20A may span a length of seat track 28 and may be releasably coupled to seat track 28 at one or more location on a bottom surface of first guide rail 20A (not shown). In some embodiments, first guide rail 20A may be coupled to seat track 28 using threaded stud 30 and locking nut (not shown). First guide rail 20A may have an opening on a bottom surface of first guide rail 20A for receiving threaded portion 30A of threaded stud 30. Seat track 28 may define channel 31 on a top surface of seat track 28 that is partially enclosed by surfaces 28A and 28B of seat track 28. Flanged end 30B of threaded stud 30 may be fitted within a pocket defined in channel 31 and enclosed by surfaces 28A and 28B of seat track 28 to secure threaded stud 30 to seat track 28. As depicted, seat track 28 may have a substantially I-shaped cross section. As depicted, floor 36 of cabin 12 may be fitted within slots defined in seat track 28. Although seat track 28 is depicted as having an I-shaped cross-section, it should be understood that seat track 28 may be of a different geometry. It should also be understood that first guide rail 20A may be coupled to seat track 28 using other suitable fastening means.

Roller 26 may be coupled to first guide rail 20A. As depicted, first guide rail 20A may define channel 27 along a top surface of first guide rail 20A between side walls 27A, 27B. Roller 26 may be at least party fitted within channel 27 and may be fastened to side walls 27A, 27B using bolts or other mechanical fasteners. Roller 26 may have rolling surface 26A configured to rotate. A portion of rolling surface 26A may be configured to engage a surface of first rail 24A. Although only one roller 26 is depicted, it should be understood that a plurality of rollers may be coupled to first guide rail 20A and configured to engage the surface of first rail 24A when first rail 24A engages first guide rail 20A (shown in FIG. 4).

Cargo container 18 may have first rail 24A and first caster wheel 34A attached thereto. First rail 24A and first caster wheel 34A may be attached to bottom surface 18A of cargo container 18 using any suitable mechanical fastening means. In some embodiments, first rail 24A may be attached to flange 29 that is bolted to bottom surface 18A of cargo container 18.

As depicted, first rail 24A may engage first guide rail 20A. First rail 24A may include track 25 on an underside of first rail 24A. Track 25 may be used to restrict lateral movement of cargo container 18 relative to first guide rail 20A. Track 25 may have side surfaces 25A, 25B that partially enclose side surfaces 26B, 26C of roller 26. When cargo container 18 deviates from a path defined by first guide rail 20A, one of side surfaces 26B, 26C of roller 26 or side surfaces of side walls 27A, 27B may abut one of side surfaces 25A, 25B of track 25. As depicted, a top portion of rolling surface 26A may engage surface 25C of track 25 to allow first rail 24A to be rolled along first guide rail 20A. The top portion of rolling surface 26A may be raised relative to top surfaces of side walls 27A, 27B. Roller 26 and its supporting structure (i.e. first guide rail 20A, seat track 28) may be configured to support a weight of cargo container 18 when first rail 24A engages with first guide rail 20A. As depicted, the top of rolling surface 26A may be elevated by a distance D1 relative to a bottom of caster wheel 34A. When first guide rail 20A is engaged with the top portion of rolling surface 26A, castor wheel 34A is elevate with respect to floor 36.

Although FIG. 3 only illustrates the engagement between first guide rail 20A and first rail 24A, it should be understood that the engagement between third guide rail 20C and first rail 24A, second guide rail 20B and second rail 24B and fourth guide rail 20D and second rail 24B may be similar to and may include like elements as the portion of system shown in FIG. 3. In some embodiments, second guide rail 20B may be used to guide cargo container 18 between rail system 16A and rail system 16B (shown in FIG. 2). Second guide rail 20B may be parallel to and laterally spaced apart from first guide rail 20A by distance D2. Second guide rail 20B may span a length of a second seat track and may be releasably coupled to the second seat track at one or more locations on a bottom surface of second guide rail 20B (not shown). Second rail 24B may be attached to surface 18A of cargo container 18 (shown in FIG. 4) and may be configured to engage second guide rail 20B. Second rail 24B may be parallel to first rail 24A and may be laterally spaced apart from first rail 24A by distance D2 (shown in FIG. 4).

Figure 4:
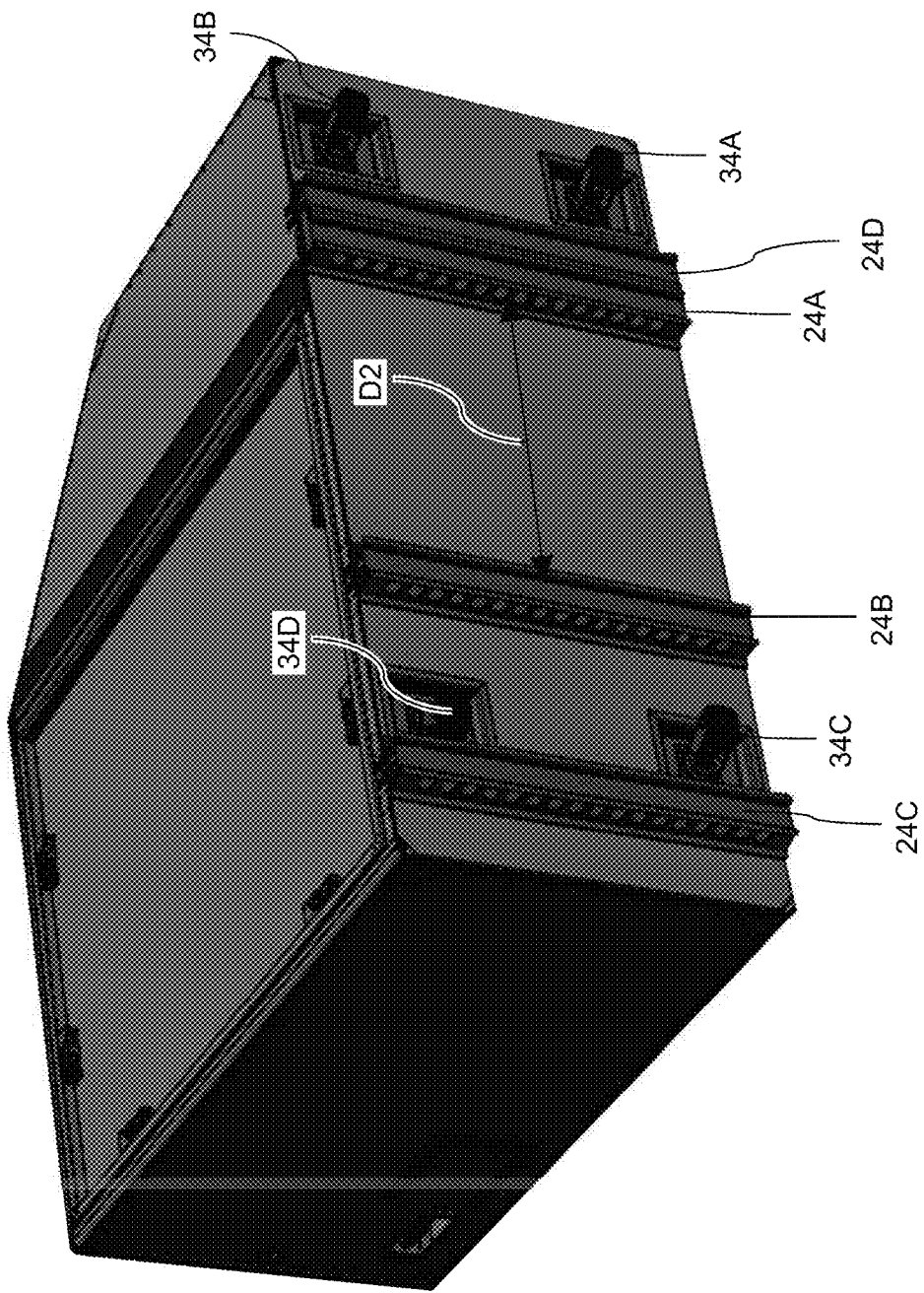
FIG. 4 is a perspective of a cargo container having rails and caster wheels attached to a bottom surface of the cargo container.

In some embodiments and as illustrated in FIG. 4, cargo container 18 may have first rail 24A, second rail 24B, third rail 24C and fourth rail 24D attached to bottom surface 18A of cargo container 18. Each of rails 24A-24D may be parallel to one another and may be spaced apart from one another. Each of rails 24A-24D may be configured to engage with a corresponding guide track in each one of rail system 14A-14D. Cargo container 18 may have first caster wheel 34A, second caster wheel 34B, third caster wheel 34C and fourth caster wheel 34D that are configured to be received within a corresponding wheel track in a each one of rail systems 16A-16C.

FIGS. 5A-5C are various perspective views of first guide rail 20A showing a plurality of rollers 26 and locking members 38 coupled to first guide rail 20A.

As depicted, a plurality of rollers 26 may be at least partly fitted within channel 27 defined between sidewall 27A and sidewall 27B of first guide rail 20A. Each of the rollers 26 may be configured to engage surface 25C of track 25 when first rail 24A engages first guide rail 20A (not shown). The plurality of rollers 26 may be fastened at each end to side walls 27A, 27B.

One or more locking members 38 may also be coupled to first guide rail 20A and may be fastened to sidewall 27A and sidewall 27B. One or more locking members 38 may be disposed between two adjacent rollers 26. Each one of locking members 38 may be configurable between a retracted positon and an extended position.

FIG. 5A illustrates a perspective view of guide rail 20A showing locking member 38 in an extended position. Arm 38A of locking member 38 may be manually lifted upwards by an operator to lift abutting surface 38B that is connected to an end of arm 38A. Once extended, the operator may use locking pin 40 to lock locking member 38 in the extended position. In the extended positon, abutting surface 38B may extend out of channel 27 of guide rail 20A. In the extended positon, a top portion of abutting surface 38B may be elevated relative to each one of rollers 26. Abutting surface 38B may be configured to abut an end of first rail 24A when configured in the extended position to restrict movement of first rail 24A along guide rail 20A (shown in FIG. 6). In some embodiments, a first one of locking member 28 may be installed such that its abutting surface 38B engages a first end of rail 24A. A second one of locking members 38 may be spaced apart from the first one of locking members 28 and may be installed such that its abutting surface 38B engages a second end of rail 24A (partially shown in FIG. 6). The second one of locking members 38 may be flipped relative to the first one of locking members 38.

FIG. 5B illustrates a perspective view of guide rail 20A showing locking member 38 in a retracted position. In the retracted positon, arm 38A and abutting surface 38B may be completely contained within channel 27. In the retracted positon, the top portion of rolling surface 26A of roller 26 may be elevated with respect to locking member 38 such that first rail 24A is free to move along first guide rail 22A over locking member 38.

FIG. 5C illustrates a perspective view of guide rail 20A showing a bottom surface of guide rail 20A. Guide rail 20A may have a plurality of openings defined on the bottom surface of locking member 28 for receiving threaded studs 30. Locking nuts may be used to couple threaded studs 30 to guide rail 20A. As depicted in FIGS. 5D-5E, each threaded stud 30 may have flange ends 30B, 30C that are configured to be fitted within two adjacent pockets defined in channel 31. Flanged ends 30B, 30C may be enclosed by surfaces 28A and 28B of seat track 28 to secure threaded stud 30 to channel 31.

Figure 6:
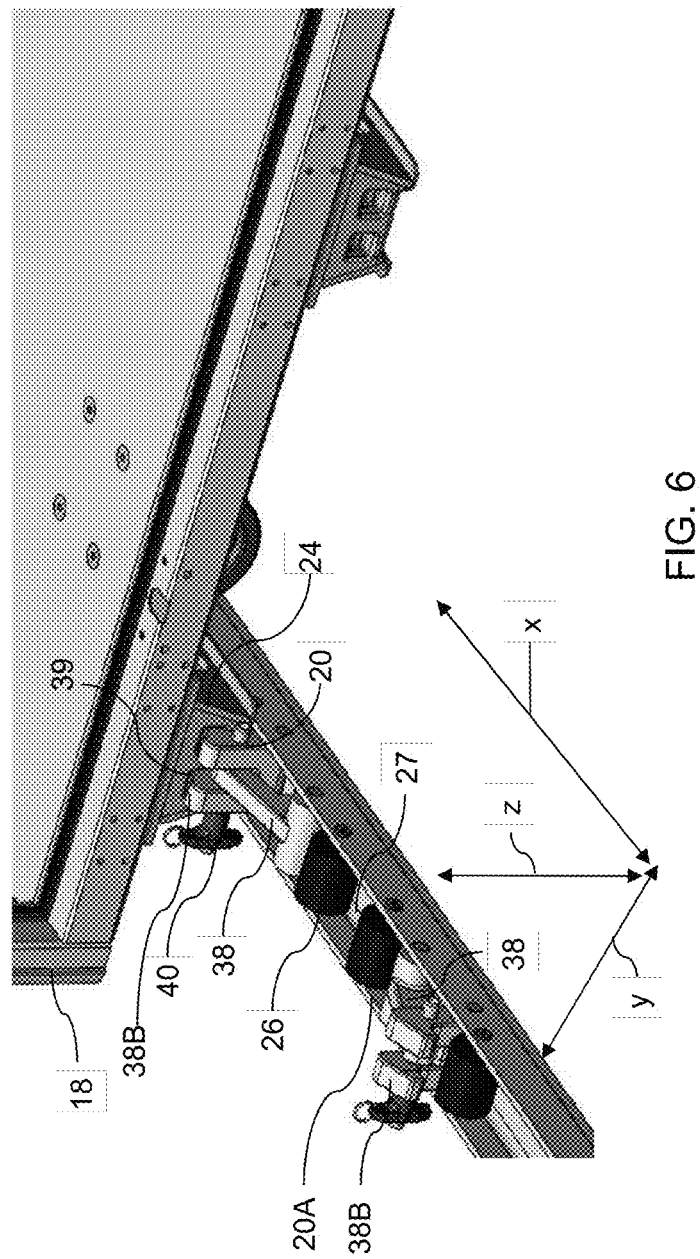
FIG. 6 is a perspective view of a portion of system 11 showing a locking member abutting an end of a rail attached to a cargo container.

FIG. 6 illustrates a perspective view of a portion of system 11 showing a locking member abutting an end of a rail attached to a cargo container. In the illustrates example, locking member 38 is in an extended position and coupled to rail 24. Rail 24 is illustrated as rail 24C; however, any one of rails 24A-24D may be engaged with a counterpart locking member. In the extended position, a top portion of an abutting surface 38B of the locking member is elevated relative to each of the rollers 26 to abut an end of the rail and restrict movement of the rail along the guide rail 20A. As shown, abutting surface 38B of locking member 38 is received in cavity 39 defined by rail 24. When locking member 38 is received in cavity 39, movement of cargo container 18 is restricted in the y direction lateral to guide rail 20A, in x direction longitudinal to guide rail 20A, and the z direction upward (i.e. perpendicular to the y, x directions). In the extended position of locking member 38, locking pin 40 may be inserted (e.g. manually) through locking member 38 to hold locking member 38 in the extended position. Locking pin 40 may extend through a hole defined by locking member 38 to abut against a top surface of guide rail 20A to hold locking member 38 in the extended position. Locking pin 40 may be removed from locking member 38 to allow locking member 38 to transition to the retracted position. When locking member 38 is in the retracted position, the top portion of the rolling surface of each roller 26 is elevated relative to the abutting surface 38B of the locking member 38. In the illustrated example, locking member(s) 38 are at least partly fitted within channel 27. When locking member 38 is in the extended position, the abutting surface 38B of the locking member 38 extends out of channel 27 and is locked in position using locking pin 40. When locking member 38 is in a retracted position (illustrated in FIG. 5B), the abutting surface 38B of the locking member 38 is substantially contained within channel 27 with all surfaces below the top portion of the rolling surface of each roller 26. According to this disclosure, a guide rail may comprise a plurality of locking members positioned along a length of the guide rail to engage a cargo container 18 from opposing side to restrict all movement in any of the x, y, z directions.

Figures 7A, 7B:
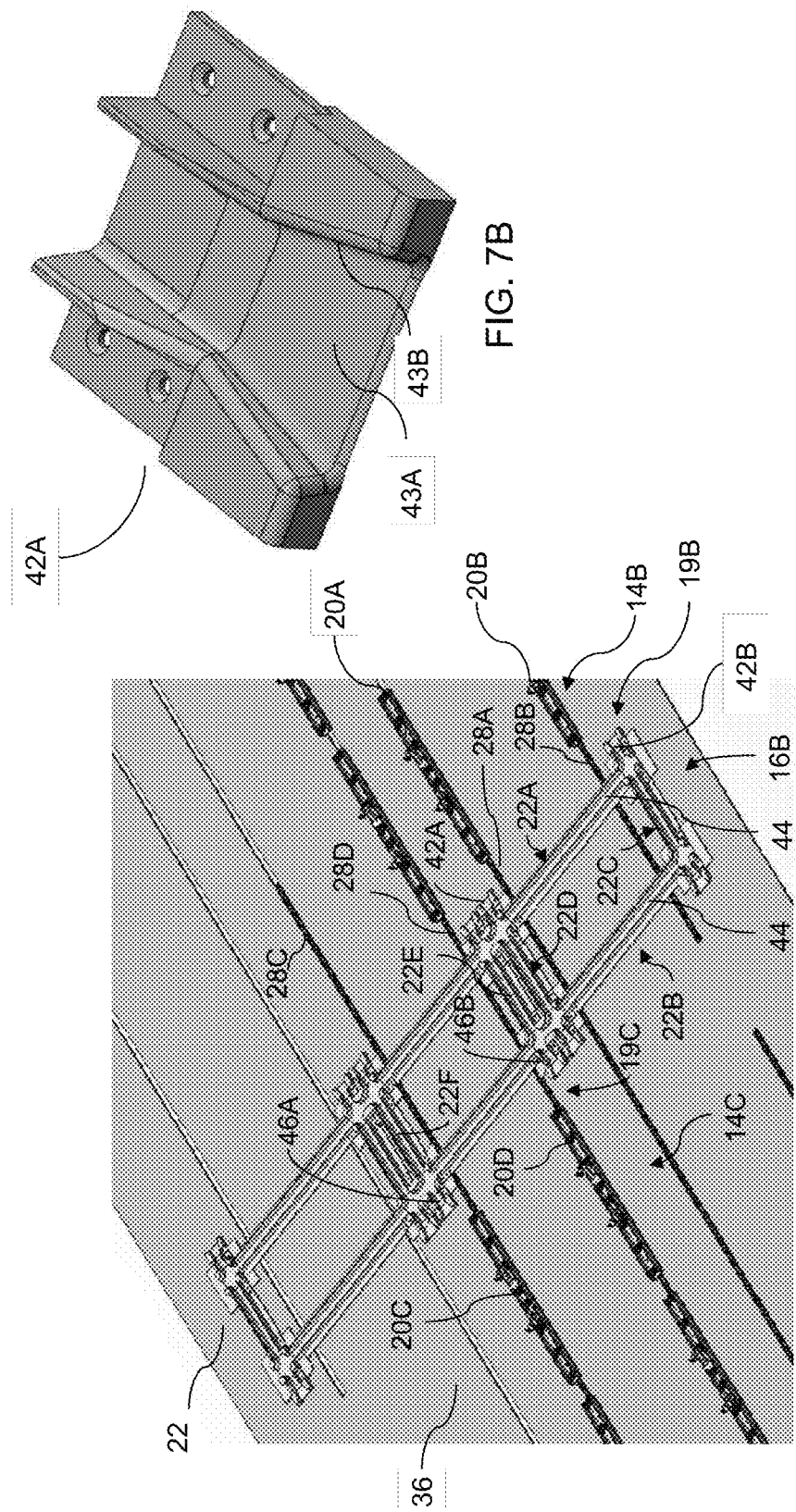
FIG. 7A is a perspective view of a portion of system 11 of FIG. 1; 7A.
FIG. 7B is an enlarged perspective view of a wheel ramp illustrated in FIG.

FIG. 7A illustrates a perspective view of a portion of example rail system 11. The illustrates rail systems may use the same system as rail systems 16A-16C described above. As shown, guide rails 20A-20D are coupled to parallel laterally spaced seat tracks 28A-28D respectively which may run along a longitudinal length of a passenger cabin of an aircraft. Guide rails 20A, 20B may be laterally spaced apart by the same distance as seat tracks 20C, 20D. Each transition zones 19B, 19C, may be provided with a wheel track 22 which defines a plurality of wheel paths that may be arranged in a grid pattern for aligning rails of cargo container 18 with different laterally spaced guide rail sets. As shown in FIG. 7A, the wheel track 22 comprises a plurality of wheel track portions 22A, 22B, 22C, 22D, 22E, 22F arranged in a grid to allow a cargo container 18 to transition to laterally spaced guide rails permitting lateral movement of a cargo container 18 with respect to cabin 12, e.g. the ability to move toward either the port side 12C or starboard side 12D of cabin 12, without resting on floor 36 of cabin 12. Each wheel tracks portion 22A-22D may be releasably coupled to laterally spaced seat tracks at one or more locations on a bottom surface of the wheel tracks. As shown in FIG. 7A, wheel tracks portions 22A and 22B are coupled to laterally spaced seat tracks 28A and 28B. Each portion of wheel track 22 may define channel 44 for receiving a wheel, e.g. castor wheel 34A-34D on bottom surface 18A of cargo container 18. Wheel track 22 may define a channel 44 which communicates each wheel track portion 22A-22F and wheel ramp 42A, 42B, 46A, 46B. Wheel ramps 42A, 42B, 46A, 46B may engage a wheel, e.g. castor wheel 34A-34D on bottom surface 18A of cargo container 18 to elevate a rail on cargo container out of engagement with a guide rail when the wheel rolls up a slope of the first wheel ramp; or lower a rail onto a guide rail when the wheel rolls down the slope of the wheel ramp.

In an example, with reference to FIG. 7A, wheel ramps 42A and 42B may each receive a wheel, e.g. one of castor wheels 34A-34D. As the wheel engages and rolls up a slope of corresponding wheel ramp 42A, 42B, cargo container 18 will elevate and decouple from guide rail 20A, 20B. The wheel may continue into channel 44. Each channel may be positioned at an angle with respect to guide rails 20A, 20B (e.g. 90° to guide rails 20A, 20B). As the wheel engages wheel ramps 42A and 42B, a weight of the cargo container 18 on guide rails 20A, 20B will transfer to wheel ramps 42A, 42B and then wheel tracks 22A-22D as the wheel enters channel 44. Continuing the example, the wheel may travel along a wheel path from either wheel ramps 42A and 42B through channel 44 of wheel tracks 22A-22D to one of wheel ramps 46A, 46B. Wheel ramps 46A, 46B may be positioned to align one of rails 24A-24D with guide rail 20C or 20D. As the wheel move down wheel ramp 46A or 46B, the rails of cargo container 18 may be lowered onto guide rails 20C, 20D transferring the weight of cargo container 18 from the wheel tracks to guide rails 20C, 20D without resting the wheel on floor 36 of cabin 12. Each wheel path may comprise a wheel ramp 42A, 42B, a wheel track 22A-22F, and wheel ramp 46A, 46B to transition a cargo container 18 from one set of guide rails 20A, 20B to a laterally spaced set of guide rails 20C, 20D. As each cargo container 18 may be provide with a plurality of wheels (e.g. castors wheels 34A-34D), each wheel path defined by wheel ramp 42A, 42B, wheel tracks 22A-22F, and wheel ramp 46A, 46B is positioned to permit each of the plurality of wheels to simultaneously move along its respective wheel path of wheel track 22.

FIG. 7B is an enlarged perspective view of a wheel ramp illustrated in FIG. 7A. Wheel ramp 42A is illustrated; however, each wheel ramp in system 11 may comprise similar features. Wheel ramp 42A comprises a sloped surface 43A providing a ramp to engage a wheel of cargo container 18. Sloped surface 43A may be generally dovetail shaped and may be defined sidewalls 43B creating a channel communicating with channel 44 of wheel tracks 22A-22D.

Figure 8:
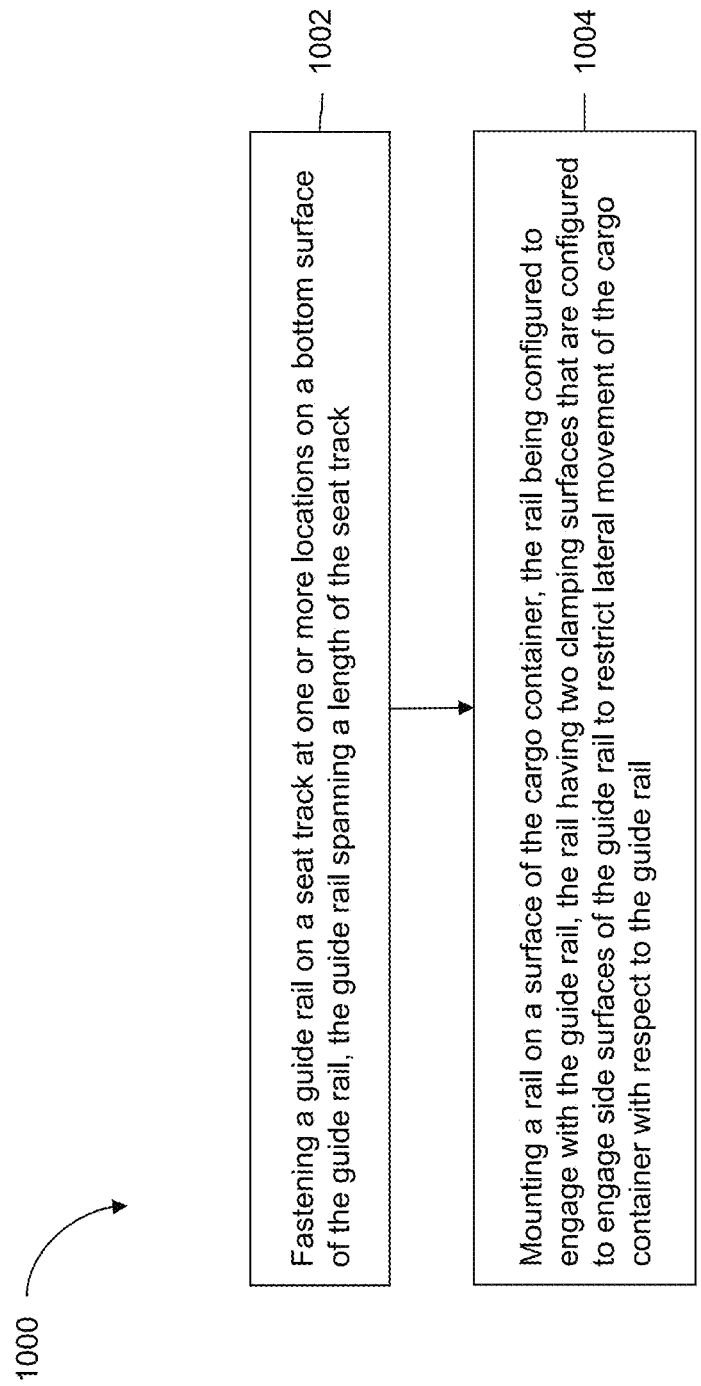
FIG. 8 is a flowchart of an exemplary method for retrofitting a cargo container and a seat track in a cabin of an aircraft.

FIG. 8 is a flowchart illustrating an exemplary method 1000 for retrofitting cargo container 18 and seat track 28 in cabin 12 of an aircraft. Method 1000 may be used with system 11 or with other system(s). Method 1000 may be combined with steps or aspect of other methods described herein. Aspects of system 11 may be incorporated into method 1000. In various embodiments, method 1000 may include:

fastening a guide rail 20A on the seat track 28 at one or more locations on a bottom surface of the guide rail 20A, the guide rail 20A spanning a length of the seat track 28, the guide rail 20A having a plurality of rollers 26 coupled thereto (step 1002); and providing a rail 24A on a surface 18A of the cargo container 18, the rail 24A being configured to engage with the guide rail 20A, the rail 24A having two side surfaces 25B, 25C that are configured to partially enclose two side surfaces 26B, 26C of the rollers 26 such that when the cargo container 18 deviates from a path defined by the guide rail 20A, one of the side surfaces 26B, 26C of the rollers 26 abuts one of the side surfaces 25A, 25B of the rail 24A (step 1004).

In some embodiments, step 1004 may occur before step 1002.

In some embodiments, method 1000 may include removing a passenger seat from the seat track 28 before the guide rail 20A is fastened to the seat track 28.

In some embodiments, the guide rail 20A may be a first guide rail 20A; the seat track 28 may be a first seat track 28; the rail 24A may be a first rail 24A; and the plurality of rollers 26 may be a plurality of first rollers 26. The method may include
- fastening a second guide rail 20B on a second seat track at one or more locations on a bottom surface of the second guide rail 20B, the second guide rail 20B being parallel to the first guide rail 20A and being laterally spaced apart from the first guide rail 20A by a distance D2, the second guide rail 20B spanning a length of the second seat track, the second guide rail 20B having a plurality of second rollers coupled thereto; and
- providing a second rail 24B on a surface 18A of the cargo container 18, the second rail 24B being parallel to the first rail and being laterally spaced apart from the first rail 24A by the distance D2, the second rail 24B being configured to engage with the second guide rail 20B, the second rail 24B having two side surfaces that are configured to partially enclose two side surfaces of the second rollers such that when the cargo container 18 deviates from a path defined by the second guide rail 20B, one of the side surfaces of the second rollers abuts one of the side surfaces of the second rail 24B.

In some embodiments, method 1000 may include
- fastening a wheel track 22 having wheel track portions 22A-22F on parallel seat tracks 28A-28D at one or more locations on a bottom surface of each wheel track portion 22A, 22B, the wheel track 22 spanning a distance between of seat tracks 28A-28D, the wheels tracks defining a channel 44 to receive a wheel of a cargo container 18;
- providing a first wheel ramp 42A, 42B for receiving the wheel of the cargo container to the wheel track, the first wheel ramp configured to engage the wheel of a cargo container 18 and elevate a first rail 24A and a second rail 24B of cargo container 18 to disengage both the first rail 24A from the first guide rail 20B and second rail 24B from the second guide rail 20A when the wheel rolls up a sloped surface 43A of the wheel ramp 42B;
- providing a second wheel ramp 46A, 46B positioned parallel to a third or four guide rail 20C, 20D, the third and four guide rail 20C, 20D spaced laterally from the first and second guide rails 20A, 20B, the second wheel ramp 46A, 46B configured to lower the first rail 24A onto the third guide rail 20A and the second rail 24B onto the fourth guide rail 20D when the wheel rolls down the slope of the second wheel ramp 46, 46B In some embodiments, the wheel track 22 defines a plurality of wheel paths, each wheel path defined by wheel ramp 42A, 42B, one or more of wheel track portions 22A-22F, and wheel ramp 46A, 46B. The plurality of wheel paths may be positioned to permit each of a plurality of wheels 34A-34D on a cargo container 18 to simultaneously move along its respective wheel path of wheel track 22.

FIG. 9A illustrates a device 100 for facilitating movement of a cargo container 18 through a door frame 101 of an aircraft. The device 100 may comprise a ball transfer deck 102 which may include a first plurality of load bearing rollers 103a defining a first plane X'-Y'. In an embodiment, first plane X'-Y' may be substantially parallel and/or co-planar with second plane A'-B' defined by a second plurality of load bearing rollers 103b of bridge 105. First plane X'-Y' may also be positioned to be substantially parallel and/or co-planar with the top portion of rolling surface 26A of roller 26 for any of the guide rails according to this disclosure. Positioning a height of first plane X'-Y' substantially co-planar with the top portion of rolling surface 26A may permit the cargo container to easily transition between ball transfer deck 102, guide rails 20A, 20B, and bridge 105. First plurality of load bearing rollers 103a may be configured for universal rotation and to receive the cargo container 18 thereon. In an embodiment, a first retaining rail 104 may be coupled to the ball transfer deck 102. The first retaining rail 104 may comprise a vertical member having a flange extending from the vertical member at a top edge of the vertical member. The volume beneath the flange may receive a portion of the cargo container, e.g. a lip 18b of the cargo container, to restrict vertical movement of said cargo container. The first retaining rail 104 may be slidably mounted to the ball deck 102 such that first retaining rail 104 may move in a substantially forward or aft direction X'. When first retaining rail 104 engaged with the cargo container, the first retaining rail 104 may be configured to restrict movement of the cargo container 18 in the forward or aft direction X' and/or vertical direction, e.g. perpendicular to plane X'-Y'.

Device 100 may comprise a bridge 105 having a length, width, a distal end 105a, and a proximal end 105b. Bridge 105 is configured to have and length and width to fit through door frame 101 of an aircraft to permit a cargo container to move between the interior and exterior of the cabin of the aircraft. Bridge 105 may comprise: a second plurality of load bearing rollers 103b defining a second plane A'-B'. Second plane A'-B' may be co-planar and/or parallel with first plane X'-Y'. The second plurality of load bearing rollers 103b may be configured for universal rotation and to receive the cargo container thereon. Distal end 105a may comprise chamfered edge, a beveled edge, or a flat edge. As shown in FIG. 9B, bridge 105 may be configured to extend through the door frame 101 in an extended position (shown in FIGS. 9A and 9B) to receive the cargo container from a ramp, lift, or other surface on which the cargo container is positioned. In the extended position, a pathway may be defined by ball transfer deck 102 and bridge 105 for the cargo container to move between the exterior of the cargo cabin and the interior of the cargo cabin. The pathway may also include guide rails 20A, 20B such that a cargo container may move between bridge 105, ball transfer deck 102, and guide rails 20A, 20B. As shown in FIG. 12, a cargo container may move in-board laterally in the Y' direction over bridge 105 onto ball transfer deck 102, and then move in the X' direction substantially along a longitudinal direction of the aircraft onto guide rails 20A, 20B.

Figure 11:
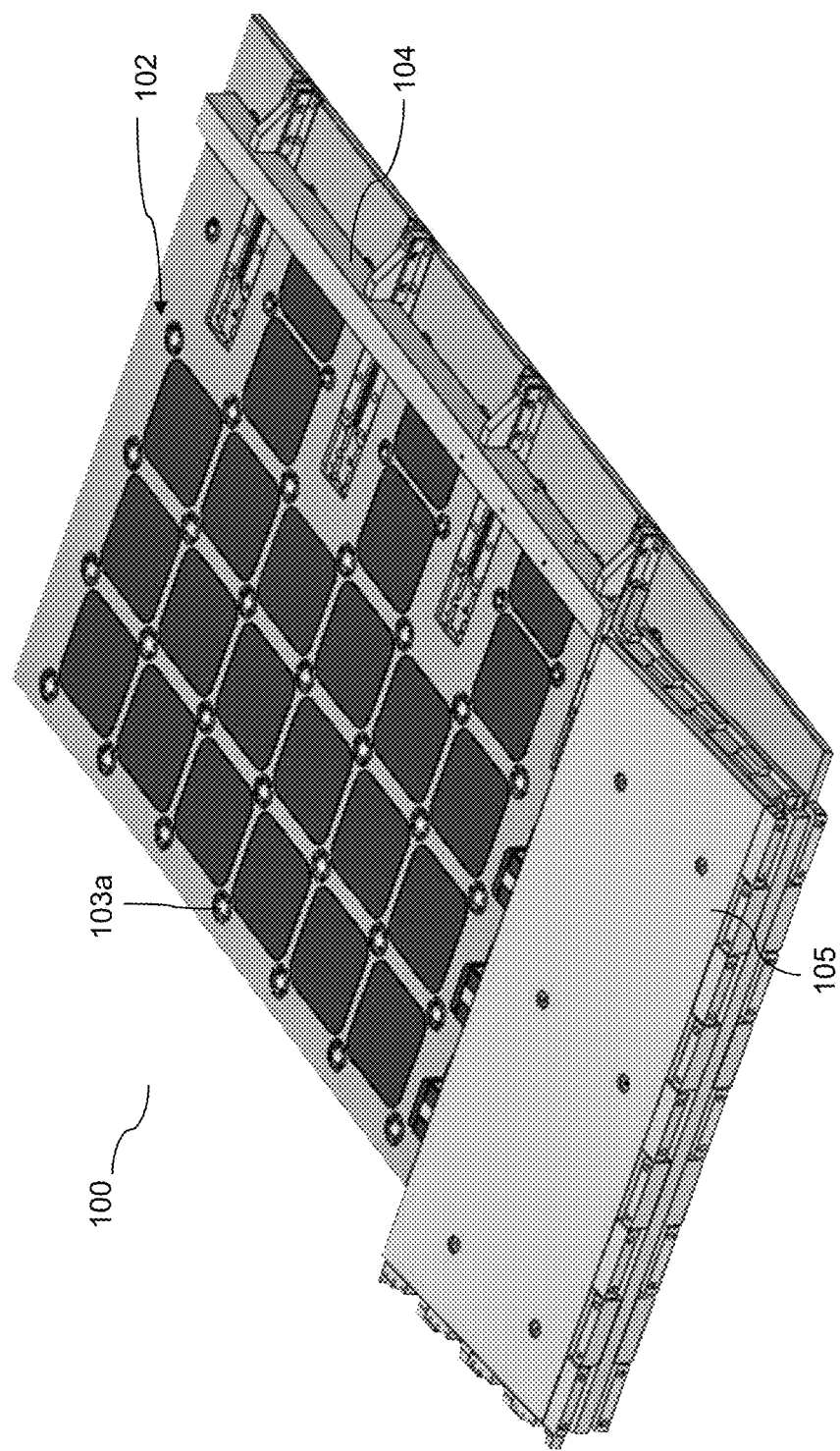
FIG. 11 is a perspective view of the device of FIG. 9A where a bridge of the device is in a retracted position.

Bridge 105 may also be configured to retract and be entirely defined within cabin 12 of the aircraft in a retracted position shown in FIGS. 11 and 12A. Bridge 105 may comprise a plurality of second retaining rails 106 configured to extend through the door frame for guiding the cargo container 18 through the door frame. The plurality of second retaining rails 106 may be positioned along a length of bridge 105 and may be positioned parallel to the first retaining rail 104. One of the second retaining rails may be positioned substantially parallel and coplanar with first retaining rail 104 such that a cargo container may move substantially in a straight path through door frame 101. The plurality of second retaining rails 106 may be foldable between a first position perpendicular to the bridge which is illustrated in FIGS. 9A and 9B, and a second position which is collapsed such that the second retain fails abut bridge 105 as shown in FIGS. 10A and 10B. Second retaining rails 106 may be coupled to bridge 105 at one or more hinges 106a which permit second retaining rails 106 to fold with respect to bridge 105.

In an embodiment the ball transfer deck 102 is coupled to bridge 105 at a hinge 107. Hinge 107 may be positioned at proximal end 105b of bridge 105. Bridge 105 may rotate about hinge 107 to move between the retracted position shown in FIG. 11, and the extended positions shown in FIGS. 9A and 9B. As shown in FIGS. 11, 12A, bridge 105 is in a retracted position in which it is entirely defined within cabin 12 of the aircraft. FIGS. 12B, and 12C illustrated bridge 105 in a transition position between the extended position and retracted position.

In an embodiment, ball transfer deck 102 comprises at least one stopper member 108 having an abutting surface 108a positioned to prevent the cargo container from moving toward the door frame as shown in FIG. 9B, 10B. Stopper 108 may be configured to move between a depressed position in which a top surface of stopper 108 is at or below plane X'-Y' to permit the cargo contain to move over stopper 80; and an elevated position where abutting surface 108b prevents the cargo container from moving in the Y' direction laterally toward door frame 101. Stopper 108 may comprise a biasing member 108b, e.g. a spring, biasing stopper 108 to the elevated position such when a cargo container moves through door frame 101 into the cabin 12, stopper 108 will move to the depressed position under the weight of the cargo container. After the weight of the cargo container moves off stopper 108, biasing member 108b may bias stopper to the elevated position to prevent the cargo container from moving laterally toward door frame 101. An opposing stopper member 108 may be positioned on the opposite side of ball transfer deck 102 to prevent a cargo container between said stopping members 108 from moving laterally in cabin 12. Stopper member 108 may have a general shape of a wedge where the abutting surface 108a is positioned in a direction away from door frame. Stopper member 108 may be lowered below plane X'-Y' to allow cargo container(s) to move over the stopper member 108 and through door frame 101.

In an embodiment, device 100 may comprise retaining rail 104 which may prevent cargo container from moving in a longitudinal direction of cabin 12. Retaining rail 104 may be slidably mounted to ball transfer deck 102, e.g. by a telescoping rail, such that retaining rail 104 may be configured to move toward and away from an opposing edge of the ball transfer deck. In an embodiment, at least one lock 109, e.g. pallet lock, may be positioned opposing retainer rail 104. As shown in FIGS. 12A-C, a cargo container 18 may be secured on top of ball transfer deck 102 during transit of the aircraft because longitudinal movement of the cargo container 18 is restricted by retainer rail 104 and lock 109, and lateral movement of cargo container 18 is restricted by opposing stopper members 108. By locking cargo container 18 on top of ball transfer deck 102, additional volume within cabin 12 may be utilized for storage and transport of cargo containers.

Figure 13:
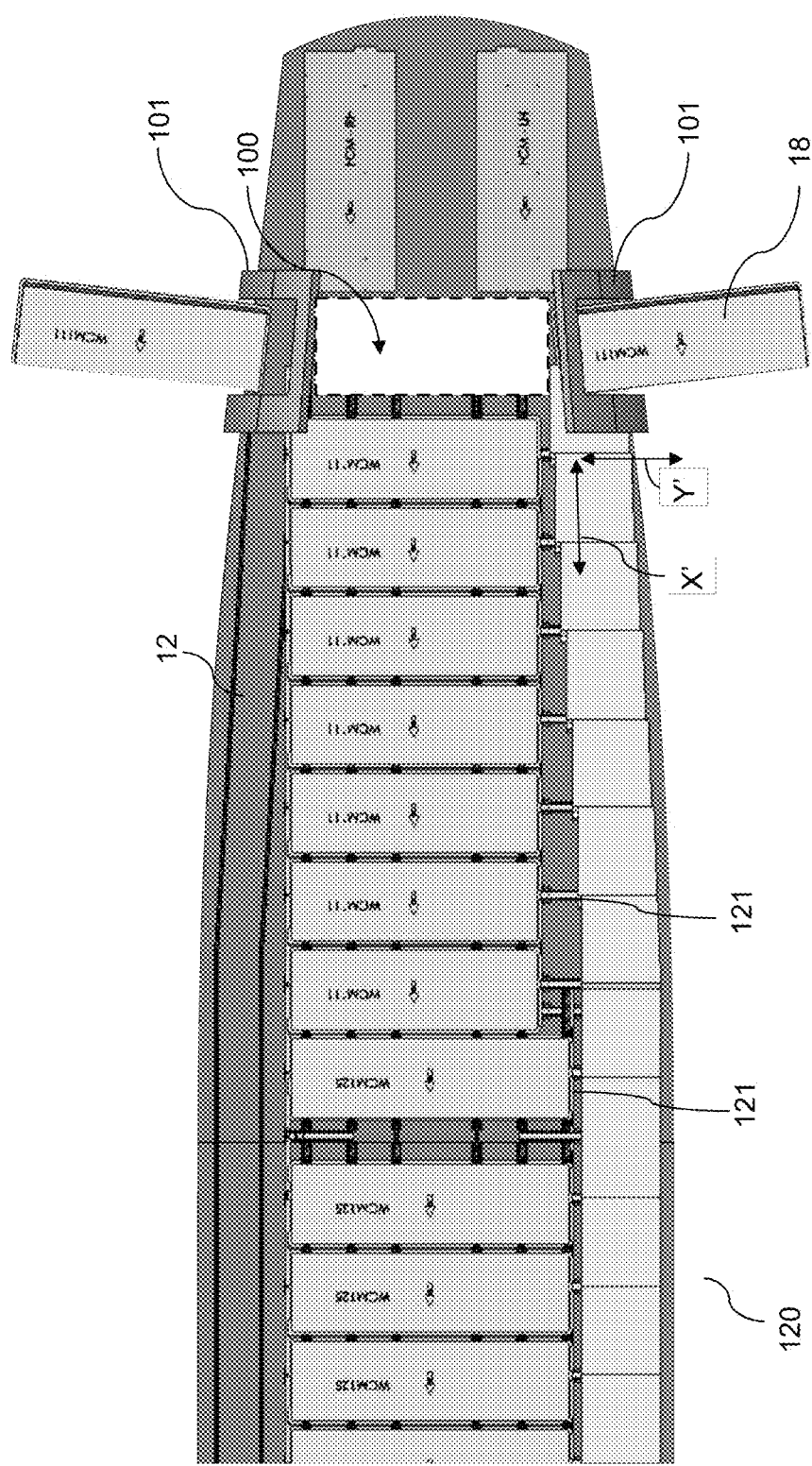
FIG. 13 is a plan view of a cabin of an aircraft showing a device of FIG. 9A and a system for transporting a cargo container.
Figure 14:
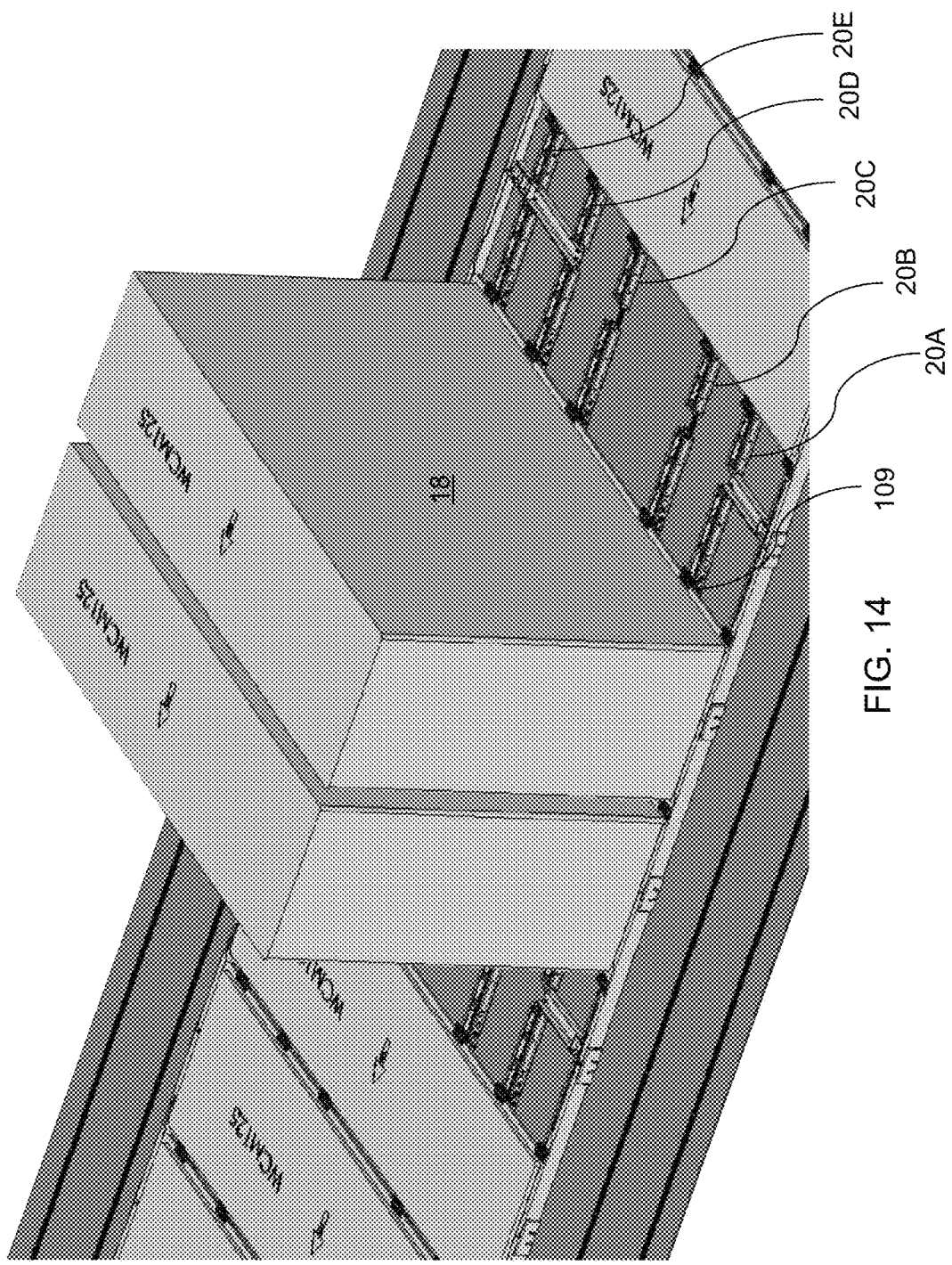
FIG. 14 is a perspective view of cargo containers position on a system for transporting the cargo containers.

Device 100 may be incorporated into system for transporting a cargo container in a cabin of an aircraft according to this disclosure. As shown in FIG. 13, device 100 may be positioned to receive cargo containers, e.g. a flat bottomed cargo container(s), entering cabin 12 though door frame 101. FIG. 13 shows cargo modules being loaded through the aft most door on the aircraft. The cargo containers move laterally through door frame 101 onto device 100 and then onto guide rail(s) 20A, 20B of system 120 according to this disclosure which move the cargo containers in a longitudinal direction X' of cabin 12. Larger cargo containers may be loaded first and secured within the forward part of cabin 12 where the fuselage is wide and of constant cross section. To accommodate movement of the larger cargo container through the narrow tapered section of the fuselage, lateral rails 121 in the tapered section may be extended. When small cargo containers are installed, lateral rails 121 may be retracted inboard to a contracted position for loading the smaller cargo containers. The retracted lateral rails 121 may the restrain the cargo modules in either the forward section of the aircraft (having a larger diameter fuselage) or the tapered section of the aircraft (having a relatively smaller and narrowing diameter fuselage) during flight. Additionally, as described below, once the cargo container is in a desired positioned, locks 109 (e.g. pallet locks), may further secure cargo container(s) in the desired position so that it cannot move in longitudinal direction X. FIG. 14 illustrates example cargo containers secured to guide rails with locks 109 (e.g. pallet locks).

Figure 15:
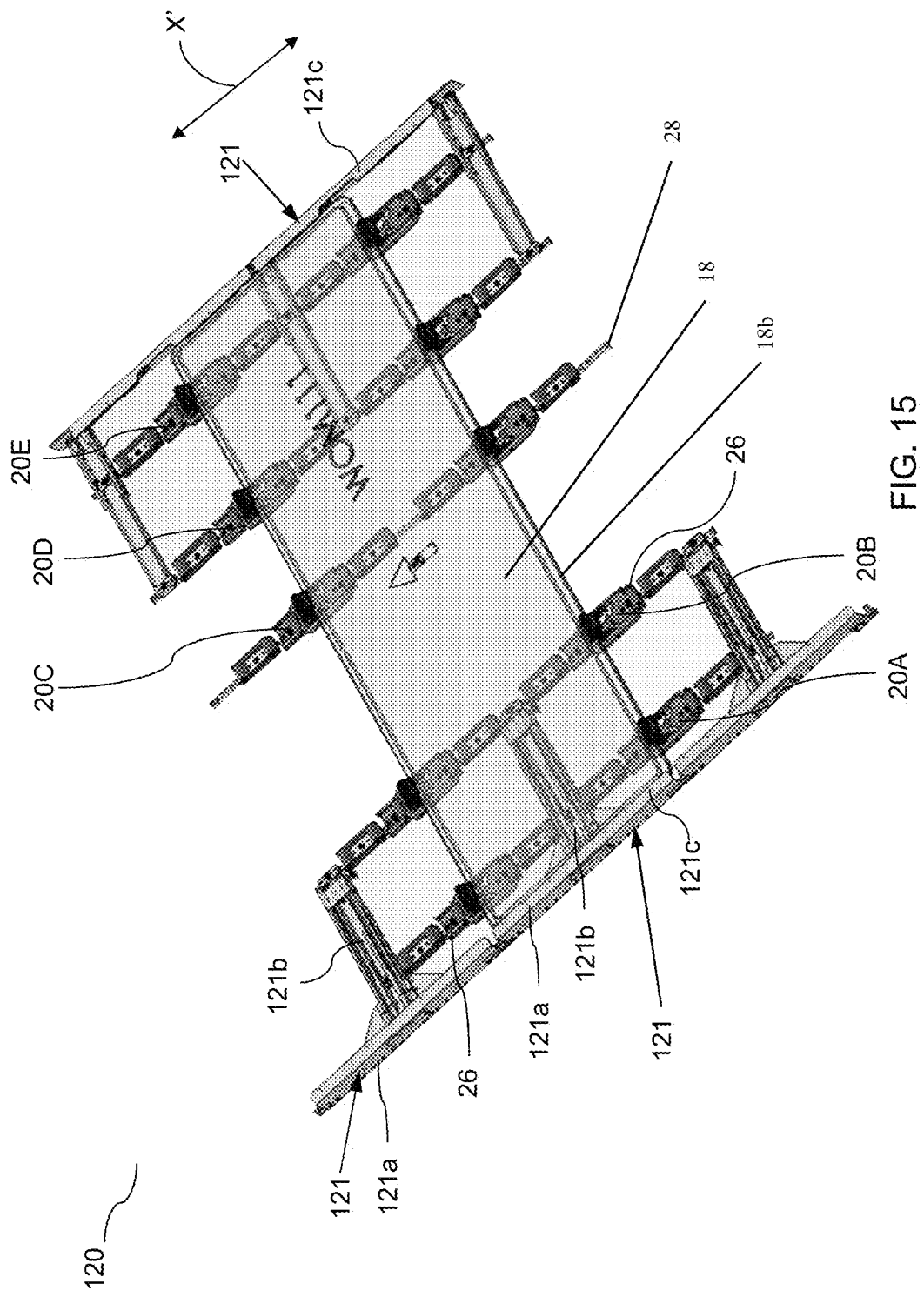
FIG. 15 is a cut-away perspective view of an example system for transporting a cargo container in an aircraft. An example flat-bottom cargo container is illustrated as transparent to show the element of the system beneath. Lateral rails of the system are shown in a contracted position.
Figure 16:
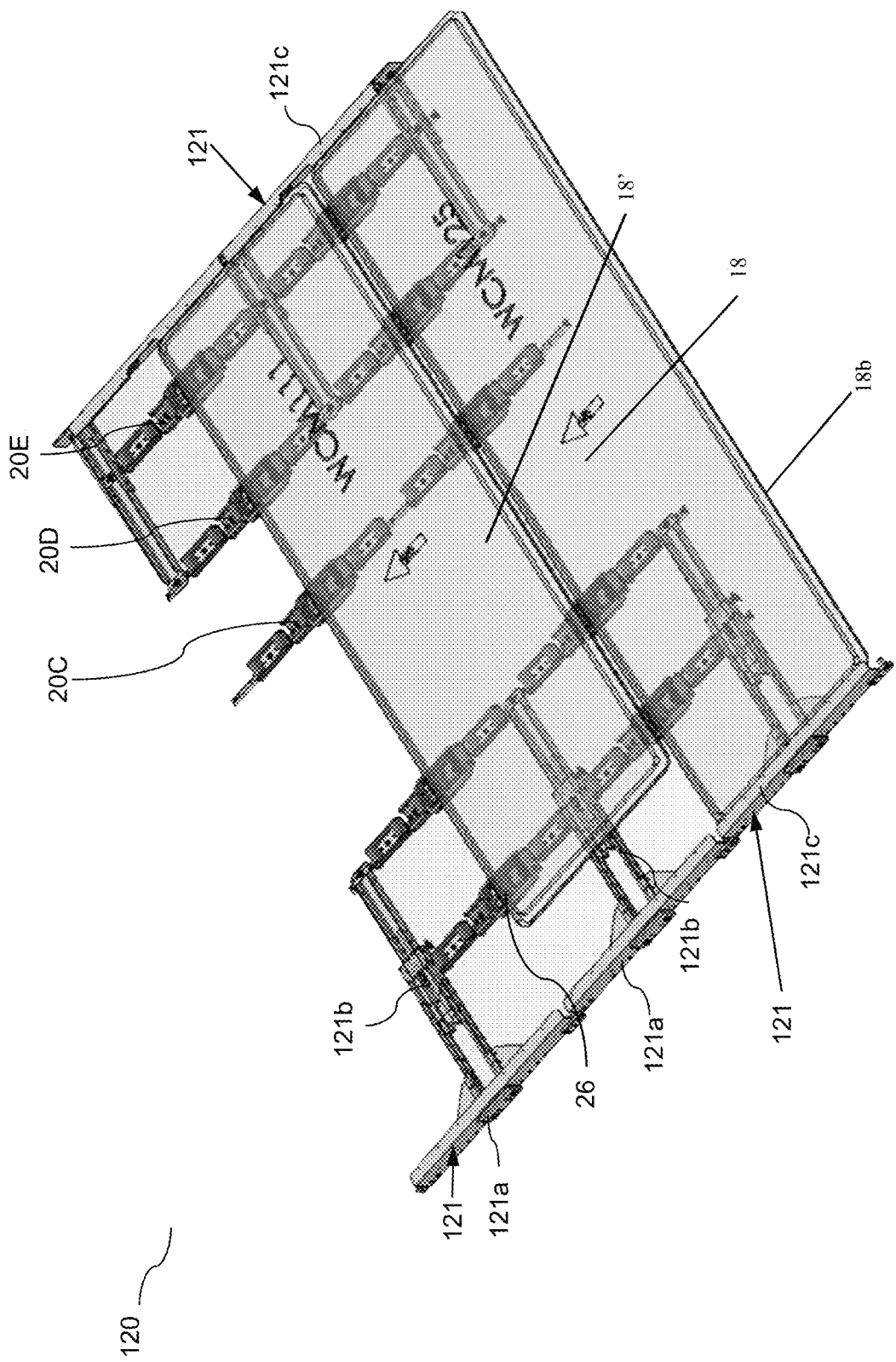
FIG. 16 is a cur-away perspective view of the system of FIG. 15 showing lateral rails of the system in an extended position.

As shown in FIG. 15, system 120 may comprise a plurality of guide rails 20A, 20B according to this disclosure, each guide rail spanning a length of a seat track and being releasably coupled to the seat track at one or more locations on a bottom surface of the guide rail. Each guide rail may comprise a plurality of rollers 26 coupled to the guide rail, the rollers positioned to engage a surface of the cargo container, e.g. a bottom flat surface of cargo container 18. As shown, cargo container 18 is transparent to illustrate the elements of system 120. System 120 may comprise a lateral rail 121 configured to move laterally within cabin 12. In an embodiment lateral rail 121 comprises a rail member configured to abut a side surface of the cargo container and prevent lateral movement of the cargo container in the cabin. The rail member 121a may be slidably mounted on a base 121b to move the rail member laterally in-board or outboard within the cabin. Base 121b may be positioned generally in a lateral direction Y' of the aircraft to span one or more seat tracks and be releasably coupled to the one or more seat tracks at one or more locations on a bottom surface of the guide rail. For example, similar to guide rails 20A, 20B, base 121b may couple seat track 28 with a threaded stud fitted within a pocket defined in channel 31 and enclosed by surfaces 28A and 28B of seat track 28 to secure the threaded stud to seat track 28. Lateral rail 121 may be a telescoping rail where rail member 121a is telescopically mounted to the base 121b, e.g. a tie bar. When the cargo container deviates from a path defined by guide rail 20A, 20B, the rail member 121a abuts one of the surfaces of the cargo container to restrict movement in a least one direction. As shown in FIG. 15, opposing lateral rails 121 may be positioned on opposing sides of the guide rails 20A-20E to define the path of the cargo container along the guide rails. The opposing lateral rails 121 may prevent cargo containers colliding with wall of cabin 12. System 120 may be installed and retrofit many different types of aircraft having different dimensions. The dimensions of each aircraft may also change along the length of the fuselage. For example, system 120 may be required to be installed in a tapered section of the fuselage of the aircraft where cabin narrows in addition to a centre portion of the cabin which has a maximum width of the fuselage. Further, to maximize storage capabilities and use of the volume within cabin 12 of the aircraft, containers having different dimensions, e.g. different widths, as shown in FIG. 16, may be required. As such, lateral rail 121 may be used to secure cargo containers in position during transit of the aircraft and/or restrict movement of the cargo container during loading and unloading to protect the walls of cabin 12 and the fuselage of the aircraft.

In an embodiment, rail member 121a is configured to be positioned parallel to a longitudinal axis of the cabin. Generally, after a cargo container is moved into the cabin, the cargo container may be moved generally along the aircraft in longitudinal direction X' generally parallel to the longitudinal axis of the aircraft along guide rails, e.g. guide rails 20A-20E shown in FIGS. 15-16. Positioning opposing rail members 121a parallel to the longitudinal axis on opposing sides of any or all of guide rails 20A-20E, may define the path of the cargo contain as it moves along the aircraft.

Rail member(s) 121a may also comprises a flange 121c for abutting a surface of the cargo container and prevent upward movement of the cargo container in the cabin. As shown in FIGS. 14-15, cargo container 18 may have a flat bottom surface extending to a lip 18b which extends a body of cargo container 18. Flange 121c may be configured to overlap lip 18b to restrict vertical movement of lip 18b and cargo container 18.

FIG. 16 illustrates system 120 and cargo containers 18, 18' positioned thereon. Cargo container 18 is transparent in the illustrated example to show the elements of system 120 under cargo container 18. As shown, cargo containers 18, 18' may have different dimensions, e.g. different widths. In the illustrated example, cargo container 18 is 38×125 inches and 70 inches high and cargo container 18' is 38×111 inches and 70 inches high. Smaller cargo containers may be used where the fuselage of the aircraft narrows in order to maximize the internal volume of the aircraft that can be filled with cargo containers. Because rail member 121a of lateral rail 121 is slidable along base 121b, rail member 121a may be moved out-board laterally, e.g. in the Y' direction, to an extended position to accommodate larger containers. Alternatively rail member 121a may move to a contracted position to abut a cargo container to prevent its lateral and/or vertical movement.

Figure 17:
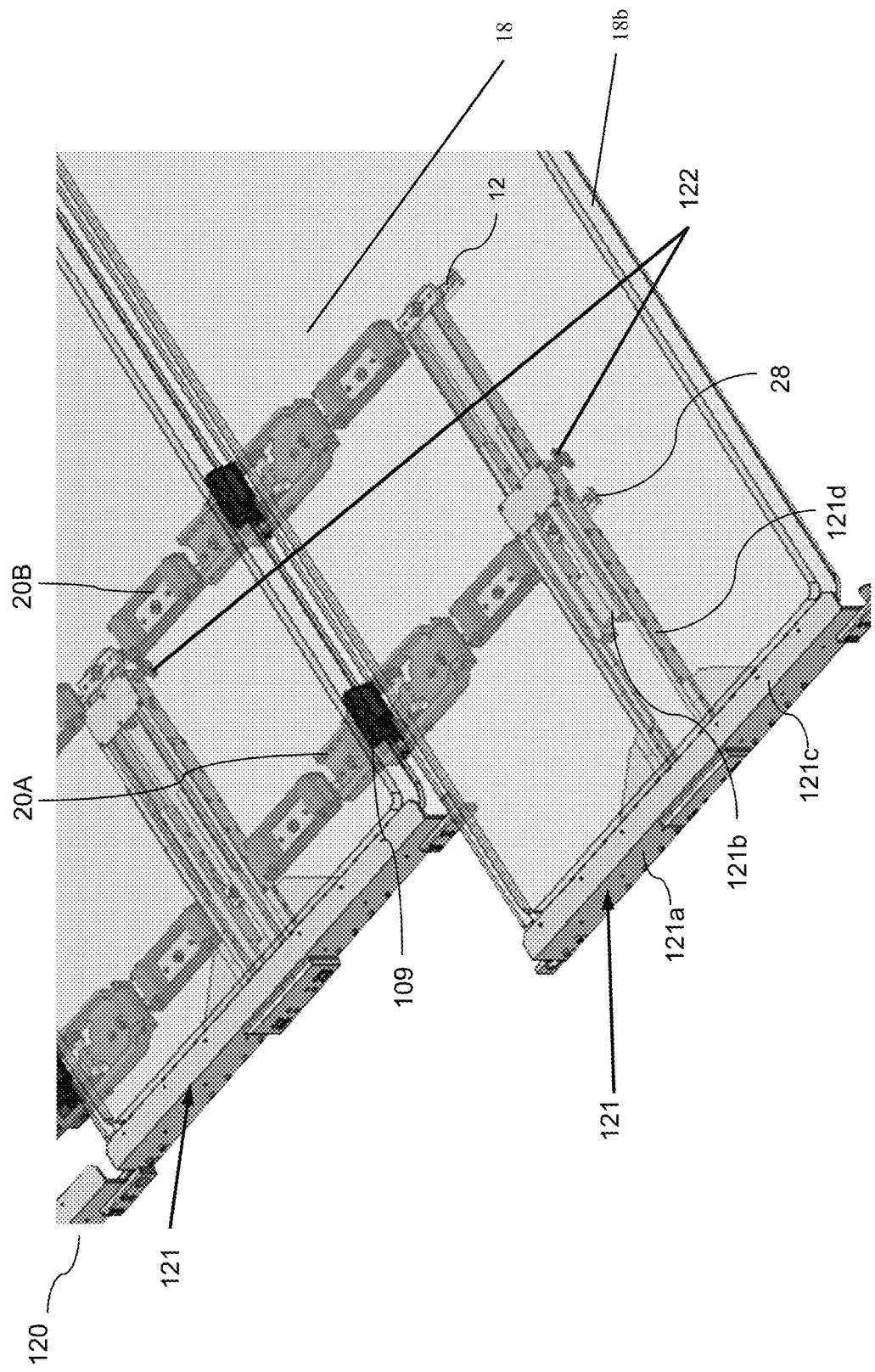
FIG. 17 is an enlarged perspective view of the system of FIG. 15 showing one lateral rail in an extended position and another lateral rail in a contracted position.

FIG. 17 illustrates of enlarged view of lateral rails 121. Cargo container 18 is transparent to illustrate the elements of system 120. Lateral rail 121 may abut cargo containers of various sizes. As shown, each illustrated rail member 121 is positioned to accommodate a different sized cargo container where one rail member 121a is contracted toward base 121b and/or guide rails 20A, 20B. A lock 122 may be provided to fix the position of rail member 121a to prevent its extension or contraction. For example, lock 122 may fix the position of (telescoping) rail member 121a relative to base 121b. In an embodiment, the lock is a detent pin. Base 121b may be a tie bar coupled to the at least one of guiderails 20A-20E and/or to one more seat tracks 28; and rail member 121 may be coupled to base 121b by a telescoping member 121d.

In some embodiments, system 120 comprises a plurality of locks 109 (e.g. pallet locks) for fixing the cargo container in a static position. As shown in FIG. 17, pallet locks may grip lip 18b of cargo container's 18 to prevent movement thereof during transit of the aircraft. Each lock 109 may couple to two adjacent cargo containers to fix the position of the cargo containers.

Figure 18:
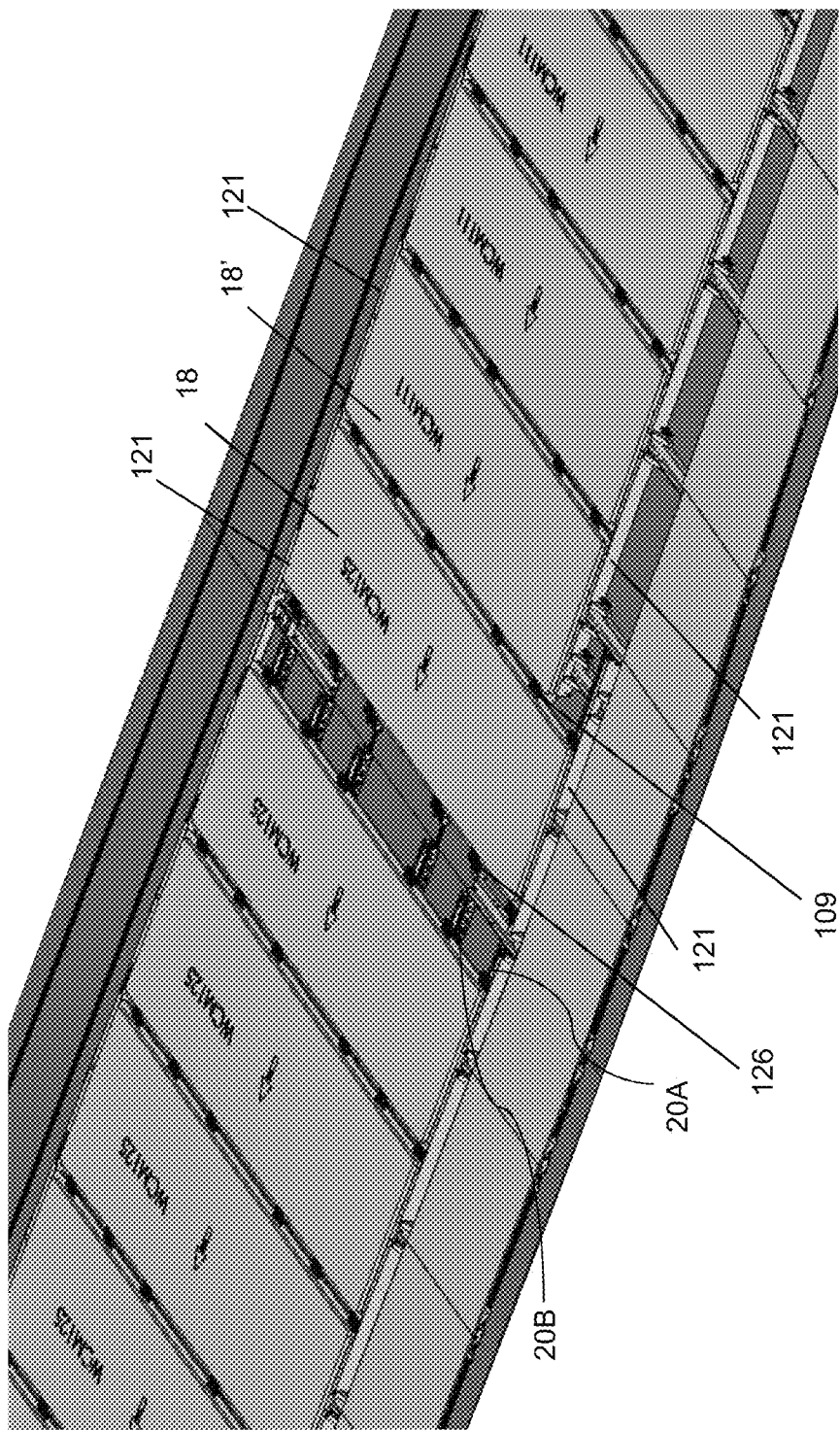
FIG. 18 is a perspective view of a cabin of an aircraft containing cargo containers positioned on the system of FIG. 15.

FIG. 18 illustrate opposing lateral rails 121 defining a pathway and storage area for a plurality of cargo containers 18. As shown, cargo containers 18 may have different dimensions, e.g. lengths, which may be accommodated by moving lateral rails 121 toward or away from the opposing lateral rail to contract or expand the distance between the opposing lateral rails. As such, cargo containers 18 sized to fit a larger portion of the fuselage may require at least one lateral rail 121 to moved to an extended position to allow cargo container 18 to move into the larger diameter portion of the fuselage. The lateral rails 121 may guide the cargo container(s) 18 as they move along the aircraft and secure them in position when the cargo containers are positioned at their desired storage location. Subsequently, in a narrower portion of the fuselage, lateral rails 121 may be moved in-board to a retracted position when loading and/or securing smaller cargo containers having smaller dimensions. Further, as described above, as the plurality of cargo container 18 move along the aircraft generally in the longitudinal direction X' of the aircraft, opposing lateral rails 121 may define the pathway for the cargo containers such that they do not contact and/or damage the cabin and/or fuselage.

In some embodiments, a first portion of the plurality of locks 109 (e.g. pallet locks) may be positioned a distance forward of a second portion of the plurality of locks, where the distance is a width of the cargo container. As such, the first portion of the pallet lockets positioned forward of the second portion, and the second portion of the locks, may each respectively secure opposing sides of the cargo container.

Pallets locks according to this disclosure may comprise materials and a design hold the cargo container static at least 10 G force. A number of suitable pallet locks designs may be suitable, e.g. a pallet lock(s) according to U.S. Pat. No. 6,193,453 or U.S. Pat. No. 3,796,397.

Figure 19:
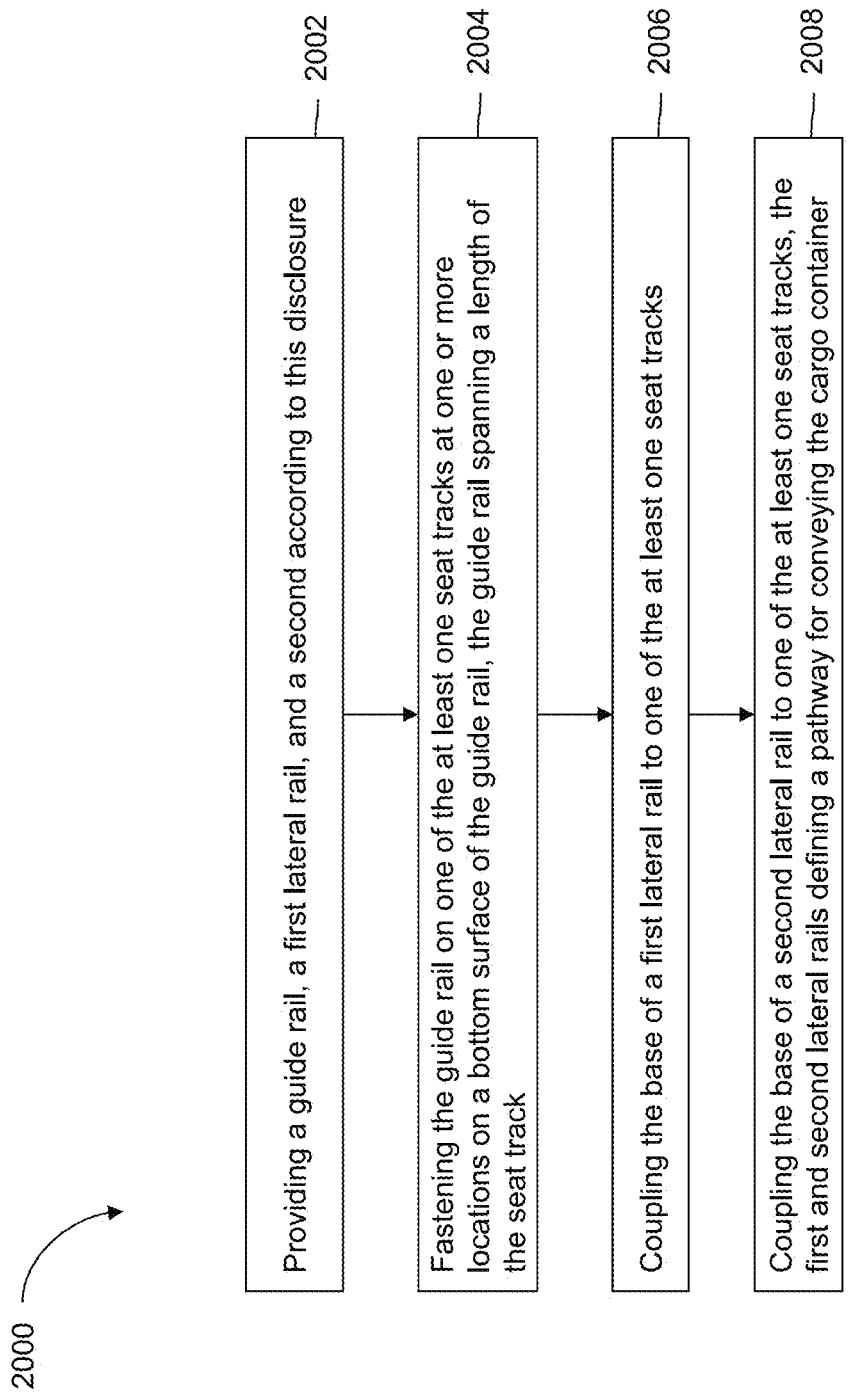
FIG. 19 a flowchart of an exemplary method for retrofitting a cargo container and a seat track in a cabin of an aircraft.

FIG. 19 is a flowchart illustrating an exemplary method 2000 for retrofitting cargo container 18 and seat track 28 in cabin 12 of an aircraft. Method 2000 may be used with device 100 and/or system 120 or with other system(s). Method 2000 may be combined with steps or aspect of other methods described herein. Aspects of system 120 and/or device 100 may be incorporated into method 1000. In various embodiments, method 2000 may include: providing a guide rail, e.g. guide rails 20A, 20B, and at least one lateral rail 121 (step 2002). Fastening the guide rail 20A, 20B on one of the at least one seat track 28 at one or more locations on a bottom surface of the guide rail, the guide rail spanning a length of the seat track 28 (step 2004). Coupling the base of a first lateral rail 121 to one of the at least one seat tracks 28 (step 2006); and coupling the base 121b of a second lateral rail 121 to one of the at least one seat tracks, first and second lateral rails defining a pathway for conveying the cargo container (step 2008).

In some embodiments, steps 2006 and 2008 may occur before step 2004.

In some embodiments, method 2000 may include removing a passenger seat from the seat track 28 before the guide rail 20A and/or 20B are fastened to the seat track 28.

In some embodiments, method 2000 may include providing a device 100; fastening the ball transfer deck of device 100 to a floor of the aircraft cabin adjacent to the door frame where bridge 105 is positioned to extend through the door frame 101 when in the expended position. The pathway is then defined by the ball transfer deck 102, the bridge 105, the guide rail(s) 20A, 20B and the first and second lateral rails.

The embodiments described in this document provide non-limiting examples of possible implementations of the present technology. Upon review of the present disclosure, a person of ordinary skill in the art will recognize that changes may be made to the embodiments described herein without departing from the scope of the present technology. Further modifications could be implemented by a person of ordinary skill in the art in view of the present disclosure, which modifications would be within the scope of the present technology.

As can be understood, the examples described above and illustrated are intended to be exemplary only. The invention is defined by the appended claims.

What is claimed is:

1. A device for facilitating movement of a cargo container through a door frame of an aircraft, the device comprising:
    a ball transfer deck comprising:
        a first plurality of load bearing rollers defining a first plane, the first plurality of load bearing rollers configured to receive the cargo container thereon; and
        a first retaining rail coupled to the ball transfer deck, the first retaining rail configured to restrict movement of the cargo container in the forward or aft direction;
    a bridge having a length, a width, a distal end, and a proximal end, the bridge comprising:
        a second plurality of load bearing rollers defining a second plane, the second plurality of load bearing rollers configured to receive the cargo container thereon, the bridge configured to extend through the door frame in an extended position to receive the cargo container, and the bridge configured to retract and be entirely defined within a cabin of the aircraft in a retracted position;
    a plurality of second retaining rails configured to extend through the door frame for guiding the cargo container through the door frame; and
    a pallet lock opposing the first retaining rail, the pallet lock positioned to lock the cargo container on top of the ball transfer deck;
    wherein the ball transfer deck and the bridge define a pathway for the cargo container to move between the exterior of the cargo cabin and the interior of the cargo cabin.

2. The device of claim 1 wherein the ball transfer deck is coupled to the bridge at a hinge, and wherein the ball transfer deck rotates about the hinge to move between the retracted and the extended positions.

3. The device of claim 1, wherein the plurality of second retaining rails are foldable between a first position perpendicular to the bridge and a second position abutting the bridge.

4. The device of claim 1, wherein the ball transfer deck comprises at least one stopper member having an abutting surface positioned to prevent the cargo container from moving toward the door frame, and wherein the stopper is configured to move between a depressed position in which the cargo container may move over the stopper and an elevated position where the abutting surface prevent the cargo container from moving toward the door frame.

5. The device of claim 4, wherein the stopper member has a general shape of a wedge, and wherein the abutting surface is position in a direction away from door frame.

6. The device of claim 1, wherein the first retaining rail is slidably coupled to the ball transfer deck and configured to be moveable toward and away from an opposing edge of the ball transfer deck, and wherein when the first retaining rail is engaged with the cargo container, the first retaining rail is configured to restrict movement of the cargo container in a direction perpendicular to a plane defined by the ball transfer deck.

7. A system for transporting a cargo container in a cabin of an aircraft, the system comprising:
    a guide rail spanning a length of a seat track and being releasably coupled to the seat track at one or more locations on a bottom surface of the guide rail;
    a plurality of rollers coupled to the guide rail, the rollers positioned to engage a surface of the cargo container; and
    a lateral rail comprising:
        a rail member configured to abut a side surface of the cargo container and prevent lateral movement of the cargo container in the cabin, the rail member slidably mounted on a base to move the rail member laterally within the cabin;
    wherein:
    when the cargo container deviates from a path defined by the guide rail, the rail member abuts one of the side surfaces of the cargo container.

8. The system of claim 7, wherein the rail member is telescopically mounted to the base.

9. The system of claim 7, wherein the rail member is configured to be positioned parallel to a longitudinal axis of the cabin.

10. The system of claim 7, wherein the rail member comprises a flange for abutting surface of the cargo container and prevent upward movement of the cargo container in the cabin.

11. The system of claim 7, wherein the telescoping member comprises a lock for fixing the position of the rail member.

12. The system of claim 7, wherein the telescoping member comprises a tie bar coupled to the guide rail, and a sliding member coupled to the structural channel and the rail member.

13. The system of claim 7, wherein the system comprises a plurality of pallet locks for fixing the cargo container in a static position.

14. The system of claim 7, wherein a first portion of the plurality of pallet locks are positioned a distance forward of a second portion of the plurality of pallet locks, wherein the distance is a width of the cargo container.

15. The system of claim 7, wherein the plurality of pallet locks are configured to hold the cargo container static at least 10G force.

16. The system of claim 8, comprising the device of claim 1, wherein the ball transfer deck, the bridge, and the guide rail define the pathway.

17. The system of claim 16, wherein the first plane is approximately parallel to a top surface of the plurality of rollers.

18. A method of retrofitting a cabin comprising at least one seat track of an aircraft, the method comprising:
    providing the system of claim 7;
    fastening the guide rail on one of the at least one seat tracks at one or more locations on a bottom surface of the guide rail, the guide rail spanning a length of the seat track;
    coupling the base of a first lateral rail to one of the at least one seat tracks; and coupling the base of a second lateral rail to one of the at least one seat tracks, first and second lateral rails defining a pathway for conveying the cargo container.

19. The method of claim 18 comprising:
    providing the device of claim 1, fastening the ball transfer deck to a floor of the aircraft cabin adjacent to the door frame, the bridge positioned to extend through the door frame when in the expended position;

wherein the pathway is defined by the ball transfer deck, the bridge, the guide rails and the first and second lateral rails.

20. The device of claim 4, wherein the at least one stopper member comprises at least one biasing member to bias the at least one stopper member to the elevated position, and wherein when the cargo container moves through the door frame into the cabin, the at least one stopper member will move to the depressed position under the weight of the cargo container.

* * * * *